United States Patent [19]
Ullmann et al.

[11] 3,975,607
[45] Aug. 17, 1976

[54] METHOD AND APPARATUS FOR CONTROLLING AN ELECTROEROSION MACHINING OPERATION

[75] Inventors: Werner Ullmann, Locarno; Bernardo Ferroni, Ascona; Renato Derighetti, Muralto; Bernd Schumacher, Losone; Silvano Mattei, Locarno-Solduno; Costantino Tadini, Locarno, all of Switzerland

[73] Assignee: A.G. fur industrielle Elektronik AGIE Losone b. Locarno, Losone, Switzerland

[22] Filed: Nov. 27, 1974

[21] Appl. No.: 527,889

[30] Foreign Application Priority Data
Nov. 16, 1972 Switzerland.................. 16663/72

[52] U.S. Cl. ............................ 219/69 M; 219/69 C; 219/69 D; 219/69 G
[51] Int. Cl.² ...................................... B23P 1/08
[58] Field of Search ............ 219/69 M, 69 G, 69 C, 219/69 D; 204/129.25

[56] References Cited
UNITED STATES PATENTS

| | | | |
|---|---|---|---|
| 3,581,045 | 5/1971 | Panschow et al. | 219/69 G |
| 3,632,942 | 1/1972 | Kondo | 219/69 C |
| 3,705,286 | 12/1972 | Kondo et al. | 219/69 C |
| 3,816,692 | 6/1974 | Ratmansky | 219/69 C |
| 3,859,186 | 1/1975 | Ullmann et al. | 204/129.25 |

*Primary Examiner*—Bruce A. Reynolds
*Attorney, Agent, or Firm*—William R. Woodward

[57] ABSTRACT

Two condition index variables are used for controlling operation in such a manner that one of the variables is kept as close as possible to a minimum value, while the other is held within an assigned range. Both condition index variables depend on the rate of flow of the flushing liquid through the working gap, on the interval between discharges in the gap or on the duty cycle or repetition frequency and amplitude of the discharge pulses. The condition index variable held to a minimum may be the integral of the square of the error signal from the regulating circuit of the electrode advancing drive, the integral of the square of the acceleration of electrode movement or the quotient obtained by dividing the square of the error signal by the square of the gap current. The regulating value to be held within an assigned range is a calculated breakdown potential defined by the relation of the variation of the error signal to the variation of the electrode spacing. The condition index variables are used to control the interval between discharges, the electrode spacing, the flow of flushing liquid, or other variables of the operation. Control of the flow of flushing liquid may be done directly where the liquid is supplied to the gap through holes in the workpiece or indirectly by intermittently backing off the electrodes to a controlled extent.

32 Claims, 12 Drawing Figures

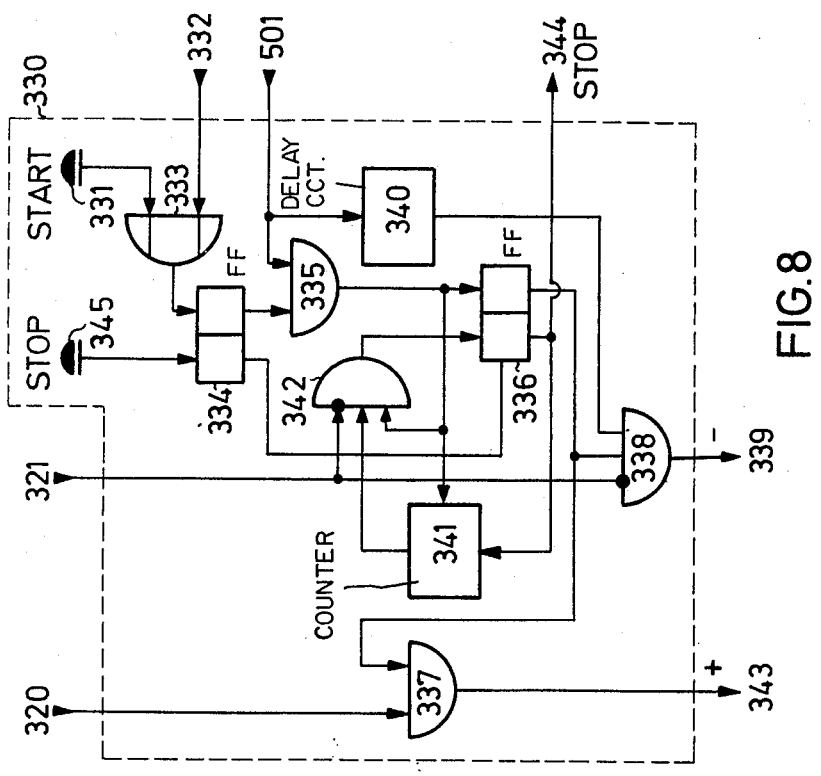
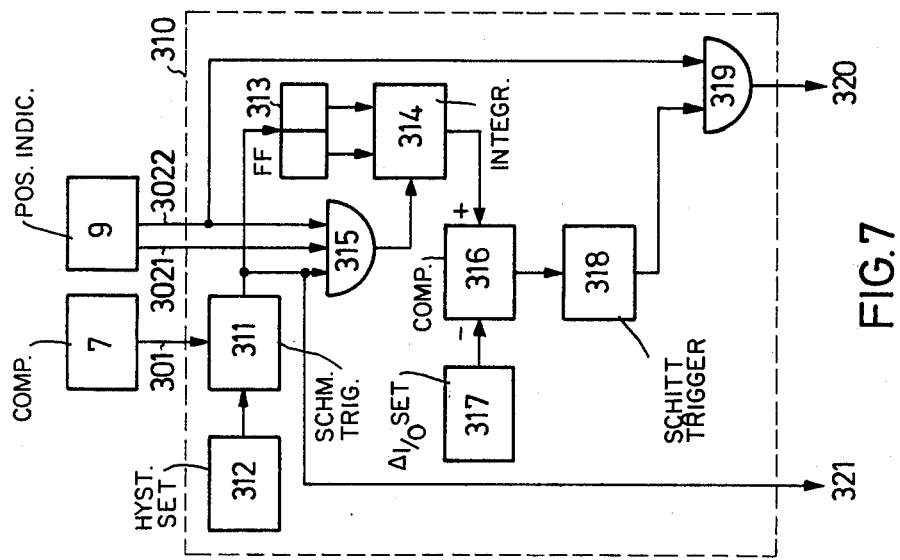
FIG.8
FIG.7

METHOD AND APPARATUS FOR CONTROLLING AN ELECTROEROSION MACHINING OPERATION

This is a continuation, of application Ser. No. 401,185, filed Sept. 27, 1973 now abandoned.

The present invention relates to a method and apparatus for controlling an electroerosion machining (EDM) operation in such a way as to maintain optimum operating conditions. The machining operation is performed in such a way that optimum operating conditions are determined and then maintained during the actual machining process.

With the development of high sensitivity drives for automatic advance of the electrodes and of controlled heavy duty generators, the requirements on speed of operation and on the accuracy of electroerosive machining have increased. As the result of improvements of the electroerosion machining process, electroerosion operations have been extended to new fields of application. The basis of the increasingly widespread range of application of electroerosion is, or course, the expectation of increased flexibility of machining together with an increased number of adjustable operation parameters. In consequence, the control of the machining process has become progressively more difficult. From a wealth of experimental data, documentary aids could be derived to constitute an elaborate literature of electroerosion technology. On the basis of such technological data, good operating results can be obtained only in the case of so-called standard operations.

The technology prescribes, for example, for a cylindrical bore penetrating all the way through the workpiece with a certain electrode matching and with a prescribed surface roughness and prescribed accuracy of the final product, certain favorable or optimum settings of the operation parameters, such as operating potential, operating current, pulse duration, duty cycle (keying ratio), pumping pressure of the dielectric flushing medium in the operating gap, servo sensitivity of the electrode drive and the like. The operating parameters just mentioned are to be regarded as determining factors for the the operation, for only the gap current and the pulse duration can be set in advance at any value in a desired range and be held constant during operation as genuine parameters. Some of the previously mentioned operating parameters undergo variation during the machining process and are therefore to be adjusted to the variable machining conditions, for example, if the pressure of the dielectric flushing medium in the working gap changes during the machining operation. Such a change is likely, for as the tool electrode penetrates into the workpiece the loading naturally increases on the pump which feeds the flushing liquid. Thus, the flushing liquid conditions in the gap are independent of the penetration of the workpiece only if the liquid pressure is continuously readjusted as penetration proceeds. In the case of complicated shapes of the tool electrode, the simultaneous maintainence of the desired machining conditions imposes a still more complicated sequence of a variety of procedures. As an example, penetration of a workpiece with a conical tool electrode may be mentioned. In that case, the active surface area of the electrode varies with the depth of penetration. By active surface area is meant that area of the electrode surface which actually participates in the electroerosion process.

In the particular case of fine machining or polishing, the active surface or region in which the actual erosive removal of material takes place wanders about on the electrode surface from one place to another in an uncontrolled manner. In the case of sufficiently large electrode surfaces, a wandering active zone is found which is smaller than the electrode surface itself.

In a manner depending upon the electrode shape the erosion machining operation can proceed under variable flushing out conditions if the flow through the machining gap of the dielectric medium, which for example may be a liquid, is regulated. In this case, the erosively machined workpiece has an irregular degree of accuracy in its dimensions as well as a somewhat high roughness on its erosively machined surfaces. In the case of erosive rough machining, which is also referred to as scouring, a conical tool electrode should likewise be advanced into the workpiece in as short a time as possible to the completion of the machining. Knowledge heretofore available furnishes no basis for any exact formula for an optimum performance of the erosion process either in general or for particular situations such as those here discussed. Laboratory experiments show, however, that operating the apparatus with a predetermined gap width held constant during the machining process provides at least approximately optimum results. The increase of the active surface of the electrode with penetration into the workpiece reduces the effective breakdown frequency of the operating pulses near any one position on the electrode. The aveage dielectric strength across the operating gap therefore rises. By dielectric strength in this connection is meant a measure for the dielectric characteristics in the operating gap taking account of the effect of the dielectric fluid medium. This dielectric strength may be expressed as a measure in terms of a theoretical or "calculated" breakdown potential, which may under certain conditions correspond to an observed breakdown potential.

On account of the increase of the average dielectric strength, the width of the operating gap decreases below the optimum value when a constant reference value is provided in the electrode drive regulation system. The wear of the tool electrode rises, and the removal of material from the workpiece is reduced. The maintainence of the optimum dielectric strength requires continuous readjustment of the time lapse of the intervals between the discharge pulses and/or of the amplitude of these pulses. If in addition the rate of flow of the dielectric medium in the operating gap is adjusted to the increased material removal load, a constant operating gap and an almost constant and maximum electrode drive velocity can be obtained in spite of increasing active surface area.

Highly developed erosion machine installations can produce more rapid processing and high value products. The interplay between the erosion machine and the operating personnel nevertheless becomes progressively more complicated, as may be seen from the simple example just mentioned. The complexity of control requires the development of a fully automatic control system. This complexity of control may be readily recognized by reference to the following summary: complexity is an effect of the control of magnitudes or parameters that mutually interact to influence each other, by the simultaneous maintainence of a plurality of working conditions, and by the exertion of control under rapidly changing conditions, all proceeding from the desire to maintain the machining operation in an optimum operating state.

Some of these problems have recently been discussed further, and a few ways to solve them have been set forth. Thus in the German Offenlegungsschrift No. 2,005,092 of Mitsubishi Denki K.K., a process and an apparatus for automatically adjusting the interpulse interval was described. In that case a voltage pulse or a series of voltage pulses with smaller values of voltage than the idling voltage were used as a criterion for an abnormal condition in the operating gap. The intervals between the pulses were reduced or increased by fixed amounts in dependence on the condition of the gap. Only two conditions of the gap were distinguished. In this case, the duration of the intervals between pulses could not be continuously varied. In consequence, this process does not have sufficient sensitivity.

In U.S. Pat. No. 3,632,942, Professor Kondo describes the direct detection of the active surface area. In this case the electrode advance velocity for a previously selected material removal rate is determined, and the active surface area is derived as the ratio of the material removal rate to the electrode advance velocity. The interpulse interval or the amplitude of the current pulse is then varied in dependence on the calculated active surface area. This method has the following significant disadvantages:

a high accuracy of measurement arises in the case of small almost undetectable electrode advance velocities; such advance velocities are common in the case of large electrode surfaces or low material removal effect;

the wearing away of the tool electrode varies with the variation of the flow relations of the dielectric medium in the operating gap and disadvantageously influences the electrode advance velocity.

An object of the invention is to overcome the disadvantages of the known processes. The individual settings that are the determining factors for the operation are accordingly adjusted to the working conditions in the operating gap. By settings must be understood the following: the flow rate of the flushing medium in the operating gap, the duration of the interval between successive individual discharge pulses or the duty cycle or repetition frequency of the discharge pulses, the amplitude of the discharge pulses, and the magnetic fields in the case of a magnetic gap expanding or fringing device. Under operating conditions, the following are to be understood: the width of the operating gap, the degree of ionization of the spark path, and the degree of pollution of the flushing medium in the gap.

The operating conditions are known to be subjected during the erosion operation to both desired changes with time and undesired changes with time. As a result of the variable depth of penetration and the variable geometry, size and lay of the active surfaces of the electrodes, undesired changes of the working conditions result. Such an undesired change in working conditions can, for example, be avoided or counteracted in a controlled manner either by intervention of an operator or by the provision of a particular preselected program in the control system of the electroerosion machine. Desired changes of the working conditions arise out of the controlled changes of the pulse amplitude, the interval between successive discharge pulses, the width of the discharge pulse and the reference value for the magnitudes used in a known manner for regulating the electrode drive system, such as average gap current or average gap voltage, breakdown voltage and/or delay time of the breakdown.

By the correction of one working condition, which is to say by the controlled change of that condition, further uncontrolled changes of working conditions may in turn be produced, because the individual working conditions influence each other. It is generally known that whenever one of the operation settings of the process is changed by an operator or by the program provided for the process, as the result of an "apparent error" in a working condition at the operating gap, the other working conditions are also changed without the operator or the program having changed anything in a controlled way regarding these other operating conditions. It is therefore very difficult to carry out an electroerosive machining operation in an optimal way. Even an operator with a great deal of experience is not in a position to satisfy these requirements in every way. The known preprogrammed control systems for electroerosive machining are likewise not capable of providing optimal operation taking account of the complicated interrelations linking the individual operating conditions in the working gap.

An object of the invention is, therefore, to adjust the operating conditions in an optimal way for each erosion operation and to change the operation settings during the machining operation in such a way that the best efficiency may be obtained.

SUMMARY OF THE INVENTION

Briefly, the electroerosion operation is regulated by reference to two condition index variables, generated in a first and a second circuit means respectively, one of which is to be held to an extreme value, such as a minimum value, while the other is to be held within an assigned range. Primary operation parameters such as desired gap width, for instance, are predetermined for the operation. The pulse duration may also be treated as a primary parameter. Both condition index variables are generated in dependence on one of the following secondary operating parameters: rate of flow of the flushing medium through the working gap; time interval between successive breakdown discharge pulses in the gap; or duty cycle (keying ratio) or repetition frequency and amplitude of the discharge pulses. Pulse duty cycle and pulse frequency, like pulse amplitude, affect the amount of electric energy dissipated in the gap. In a third circuit means, the operation settings are modified for the influencing of the output circuits of the first and second circuit means. A fourth circuit means is provided and the operating settings are so introduced to the third and fourth circuit means as to cause the first condition index variable to take its extreme value (for example, its minimum value) and to hold the second condition index variable within its assigned range. This assigned range is defined by not more than two limiting magnitudes of deviation from a reference value.

The apparatus provided in accordance with the invention for performing the method just outlined has the following features. The first circuit means has its input connected to the electroerosion machine for receiving signals dependent upon the operation magnitudes and has its output connected to the third circuit means to supply to the input of the latter signals representing the first condition index variable The second circuit means has its input likewise connected to the electroerosion machine for receiving signals dependent upon the operation magnitudes and has its output connected to the third circuit means for supplying to the input of the latter signals representing the second condition index variable. The third circuit means, in response to the signals coming from the first and second circuit means provides output signals to an input of the fourth circuit means for modifying the operation settings in dependence upon the condition index variables.

The first condition index variable may be a value derived from the integral of the square of the regulating error in the regulating circuit of the electrode advance drive of the erosion equipment. Other possibilities are to derive the first condition index variable from the integral of the sqaure of the acceleration of the movable electrodes or from the integral of the quotient of the square of the regulating circuit error divided by the square of the gap current.

The second condition index variable is preferably in the form of a calculated breakdown potential representative of the dielectic strength of the gap which is determined by the relationship of the variation of the regulating error of the electrode drive to the corresponding variation of the electrode spacing which may be the average electrode spacing in the case of a pulsed electrode drive.

BRIEF DESCRIPTION OF THE DRAWINGS

The invention will be described by way of example with reference to the accompanying drawings, wherein:

FIGS. 5 and 7 are circuit diagrams of the evaluation stage 300 forming part of the apparatus of FIG. 2;

FIGS. 6 and 8 are circuit diagrams of the decision stage 400 forming part of the apparatus of FIG. 2;

DESCRIPTION OF THE PREFERRED METHOD OF OPERATION

Figure 1B:
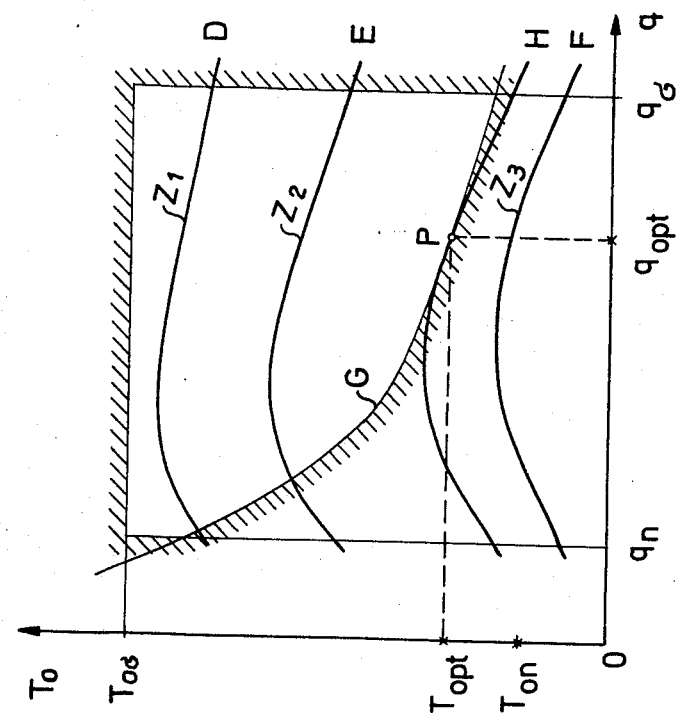
FIGS. 1a and 1b are graphs of characteristics of the electroerosion process for explanation of the invention.
Figure 1A:
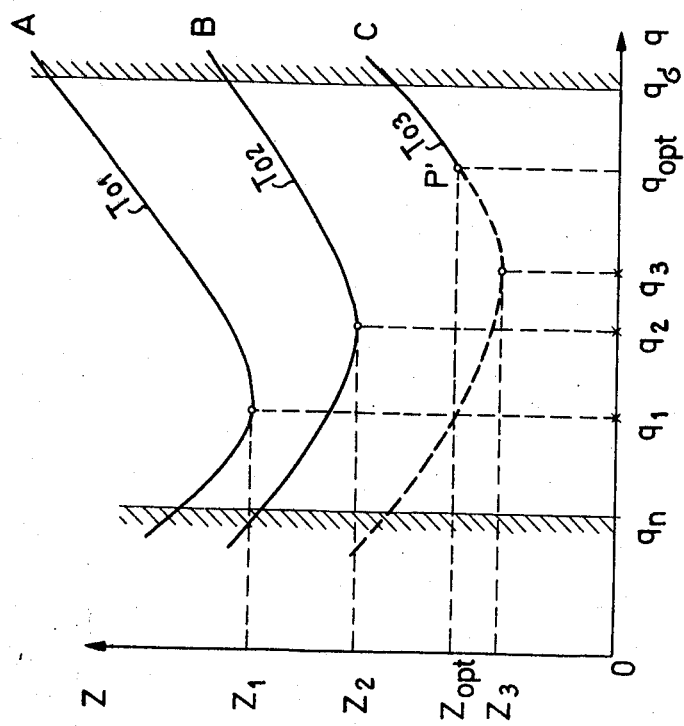

In the graphical representation of FIG. 1a, the flow rate q of the dielectric liquid through the operating gap 3 (FIG. 2) is plotted as the abscissa. As ordinate in the same figure is plotted the mean squared value Z of the regulation error signal in the electrode drive circuit. The mean squared value Z of the regulation error is calculated in accordance with experimental data, as the integral of the square of the error of the drive regulation over a predetermined time period. By regulation error is understood the difference between the actual value of the regulation magnitude for the electrode drive regulation and its reference value used in the regulation. This is described in detail in U.S. Pat. application Ser. No. 312,864 filed Dec. 7, 1972 since issued as U.S. Pat. No. 3,859,186 to three of the present inventors.

As shown in that copending application, in order to maintain the desired electrode gap spacing as the work proceeds, i.e., as the tool electrode is advanced into the workpiece electrode by an automatic electrode drive, electrical conditions in the gap are measured and these are compared with a reference electrical signal corresponding to the desired gap spacing to provide an error signal, which may then be further processed to take account of the inertia of the movable electrode or electrodes, for finally providing an impulse that can be translated into a mechanical driving of the electrode in the proper direction for a suitable increment to correct the gap spacing. According to the invention of the aforesaid copending patent application, which discloses the means and method for controlling the electrode drive that is preferred by the present inventors, the magnitude representative of the actual gap spacing, which is termed in that application as the regulating value is the magnitude of a signal formed by measuring the peak pulse voltage and then, unless the peak pulse voltage is below a certain threshold value, adding a signal proportional to the time between a certain stage of the rising edge of the pulse and a certain stage of the falling edge of the pulse. The regulating value thus determined is compared with a reference value representative of the desired gap spacing and the difference obtained by this comparison is the regulating error. The regulating error signal is then furnished to other circuits, symbolized in the present application by the block 10 of FIG. 2, where account is taken of the motion of the electrodes to produce a predicted regulating error signal which governs the direction and amplitude of the movement imposed upon the electrode drive in order to correct the gap spacing. The regulation error or regulating error referred to in the present specification is to be understood as including the kind of signal described as the regulating error in the aforesaid copending application, as well as other signals of the kinds heretofore used to represent the gap spacing error in the control of the electrode drive of an electroerosion machining apparatus.

In FIG. 1a are shown the results of an experiment with a copper-steel electrode pair under constant pulse duration, constant pulse current, regulation of the gap width to a constant value and variable flow rate 9. This figure shows three curves, A, B and C. Each of these curves relates to a constant interpulse interval, respectively $T_{01}$, $T_{02}$ and $T_{03}$. With constant interpulse interval and variable flow rate $q$, for every particular flow rate $q$ there is a corresponding particular average squared value Z of the regulation error of the electrode drive circuit. Within the region defined by the boundaries provided by the lowest appropriate flow rate $q_n$ and the highest appropriate flow rate $q_\sigma$ each of the curves A,B and C of FIG. 1a show a minimum value which represents the condition for the lowest sensitivity of the overall gap width regulation with respect to disturbing influences, in other words the greatest resistance of the regulation system to disturbances. The boundaries provided by the values $q_n$ and $q_\sigma$ for the flow rate are provided with shading on FIG. 1a in order to emphasize the region under consideration.

Figure 2:
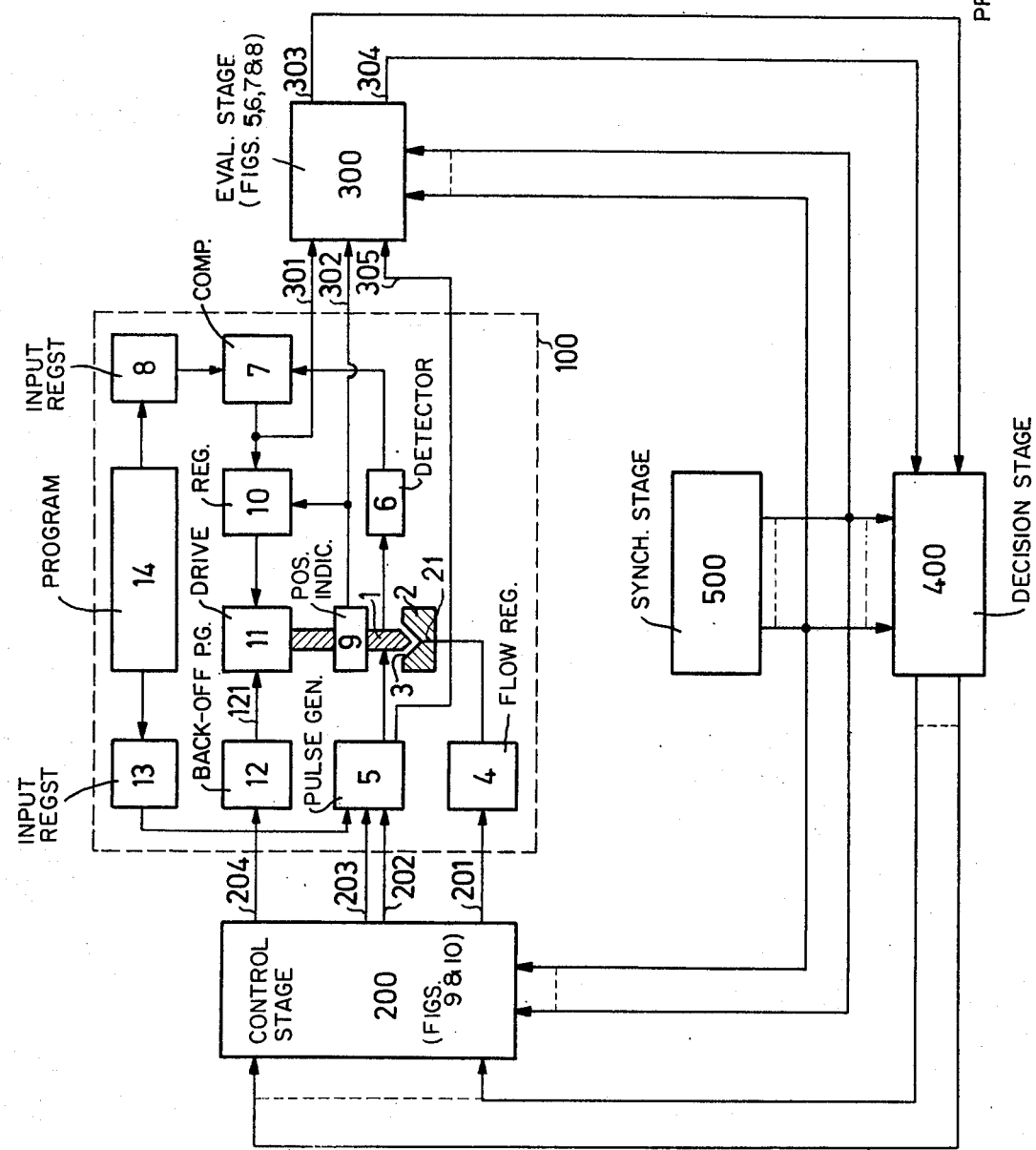
FIG. 2 is a block diagram of an apparatus arranged for carrying out the process of the invention with an electroerosion installation.

Consider, for example, the curve A corresponding to the fixed interpulse interval $P_{01}$. The minimum value of the flow rate in this case is designated $q_1$. This flow rate corresponds to the average squared value $Z_1$ of the regulation error in the electrode drive. If now a flow rate smaller than $q_1$ is chosen, the average squared value $Z_1$ rises with the result that so-called idling impulses occur very often in the operating gap 3 (FIG. 2). In the case of a flow rate greater than $q_1$, the average squared value $Z_1$ of the regulation error in the electrode drive likewise rises and suddenly working pulses similar to short circuits occur in the operating gap 3. The greater the flow rate is chosen in this case for the curve A, the more frequently these short-circuit-like operating pulses occur until the discharges gradually charge into a continuously burning electric arc, which at all events is to be avoided. The optimum operating behavior of the process is therefore to be found only at the position of the curve A at which the flow rate is $q$, where the average squared value of the regulation error has a minimum value.

If the interpulse interval is reduced from $T_{01}$ to $T_{02}$, a higher rate of material removal appears and the gap is accordingly increased. Operating relations for the smaller interpulse interval $T_{02}$ are shown symbolically in the curve B. The scatter of the regulation magnitude about its reference value becomes smaller in the electrode drive circuit. In this manner the smallest average squared value $Z_2$ on the curve B, corresponding to the flow rate $q_2$, is smaller than the smallest average squared value $Z_1$ on curve A. The reason for this effect is that the greater gap width has the effect of facilitating the overall electrode drive regulation.

If the interpulse interval is still further reduced to $T_{03}$ in order to increase the efficiency, then the situation arises that the thermal load capacities of the tool electrode 1 and of the workpiece electrode 2 are exceeded. This case is represented in FIG. 1a by the curve C. Here it is shown that the value of flow rate $q_3$ corresponding to the smallest average squared value $Z_3$ of the regulating error no longer coincides with the best usable value of the flow rate.

If the flow rate under conditions described by curve C drops below a limit corresponding to the optimum flow rate $q_{opt}$, a deterioration of the dielectric strength of the operating gap 3 occurs. As already mentioned, the dielectric strength or the corresponding breakdown potential value, is a measure for the dielectric characteristics of the operating gap. When this deterioration occurs, the electrode drive performs a movement departing from normal regulation in order to avoid this arc-forming tendency. This reaction of the electrode system to the variation in dielectric strength has the effect of reducing the material removal rate at the surface of the workpiece electrode, increasing the wearing away of the tool electrode and distorting the configuration of the image or aspect of the eroded surfaces at the tool electrode. A normally electro-eroded surface has a dull or matte appearance. The oscillations of the electrode drive regulation caused by the interruption of normal regulation result in a different image or aspect of the eroded surfaces at the tool electrode. In this case shiny faces are produced on the surfaces of the electrodes, an undesired effect. During these oscillations it is no longer possible to consider the smallest squared average value $Z$ as defining the optimum operating condition. With reference to FIG. 1 it should further be mentioned that the form and position of the three curves A, B and C are subject to change in dependence upon the electrode area that is active in the operation, and also upon the electrode materials, as well as in response to the discharge energy of the individual operating pulses during the machining operation.

Whereas FIG. 1a shows the dependence of the average squared value Z of the regulation error in the electrode drive circuit upon the rate of flow $q$ of the dielectric medium at the particular time, FIG. 1b shows the dependence of the interpulse interval $T_0$ upon the rate of flow $q$ at the particular time when the average squared value Z is held constant. In FIG. 1b the rate of flow $q$ of the dielectric medium is plotted as the abscissa. The range of variation is defined by the lower and upper boundaries $q_n$ and $q_\sigma$ respectively. The interpulse interval $T_0$ is plotted as ordinate, with the practical limits being indicated as $T_{0n}$ and $T_{0\sigma}$.

The relationship between interpulse interval and rate of flow of dielectric medium is represented by the curves D, E and F. Each of these curves is for a constant average squared value $Z_1$, $Z_2$ and $Z_3$. The curve G defines the boundary between the permissible range of values of the interpulse interval and of flow rate and, on the other hand, the forbidden range of these paired values. Beneath this curve G is the forbidden region in which a continuous electric arc is found in the operating gap 3, this condition calling forth, as previously mentioned, an undesired movement of the electrodes 1 and 2.

The optimum combination of interpulse interval $T_0$ and flow rate $q$ is given by the point of tangency of the two curves H and G. This point of tangency is designated P in FIG. 1b. It is defined by the coordinate values $q_{opt}$ and $T_{opt}$. The optimum combination in FIG. 1b corresponds to the point P' indicated on curve C in FIG. 1a. This point P' is similarly defined by the coordinate values $q_{opt}$ and $Z_{opt}$. The average value $Z_3$ of FIG. 1a produces in FIG. 1b the curve F for the constant average value $Z_3$. This curve F, however, lies entirely in the forbidden region in which, as already mentioned, an undesired arc formation occurs in the operating gap. The curve G can be subject to shifting or changes in form during the erosion operation, in dependence upon the active surface area of the electrodes and the discharge energy of the individual operating pulses.

It should further be noted that the relation between the function Z of the average squared value of the regulating magnitude and the flow rate $q$ of the dielectric medium in the operating gap, shown in FIG. 1a as curves A,B, and C, and likewise the relation between the flow rate $q$ and the time interval $T_0$ between the individual operating pulses, shown in FIG. 1b of curves D,E,F,G and H, do not correspond to any known function.

The curve G is the important one for the following description. On account of the unknown nature of this function, pre-programming of the previously mentioned operation settings in dependence of some measured condition in the electroerosion machining process is quite impossible. If these functions are not known, it is likewise not known, in contrast to the requirements of a regulating system, in which direction the operation settings should be changed in order to obtain the desired conditions. The displacement and modification of the individual functions shown by the curve families of FIG. 1a and FIG. 1b are not necessarily continuous and may vary by jumps. The latter effect occurs, for example, in the case of electrodes with complicated shapes, if during the erosion operation new surface portions of the electrodes come to participate in the erosion process. Such disturbances are known as "episodic" disturbances. In addition to these episodic disturbances, periodic disturbances can also take place. Periodic disturbances occur in the electroerosion machining of large surfaces of the electrodes when the individual discharge pulses are of low energy. In this case the active zone — i.e., the portion of the surface of the electrode which participates in the erosion process — is much smaller than the whole electrode surface In this case the active zone wanders around on the electrode surface in an uncontrolled fashion. The electroerosion machining process still goes on, but with modified and unpredictable flow conditions for the dielectric medium. It is then impossible to obtain and especially to maintain an optimum erosion machining condition during the entire machining process with known ordinary measuring instruments or measuring installations, such as voltmeters, ammeters, short-circuit detectors and path measuring instruments. Even if appropriate measuring installations and evaluating equipment is available, it is nevertheless progressively more difficult in industrial operations to find a suitable operator to carry out such a machining process at the best efficiency with full utilization of the capacity of the array of equipment. In the following paragraphs the method and apparatus for obtaining an optimum machining operation condition and for automatic adjustment of the operation settings in accordance with the invention is described in further detail with reference to an illustrative embodiment.

A known type of electroerosion installation 100 is shown in FIG. 2. The tool electrode 1 and the workpiece electrode 2 form the operating gap 3. The flow regulating means 4 delivers a certain rate of flow $q$ of dielectric medium to the operating gap 3 through a feed channel 21 bored through the workpiece electrode 2. For simplification of the drawing only one channel bored through the workpiece is shown. Of course several such holes may be provided. It will also be readily recognized that similar liquid feed ducts may also be bored in the tool electrode.

The pulse generator 5 delivers to the operating gap 3 a sequence of voltage or current pulses which may generally be designated as working pulses. The detector 6 determines the actual physical magnitudes relating to the working gap 3, which are utilized for regulation. These actual magnitudes are supplied together with the corresponding reference values or command values to the difference evaluating means 7. The difference evaluating means 7, which may also be referred to as a comparator or a subtractor, forms the difference between the command values and actual values and provides an output signal corresponding to the regulation error $e$ to the regulator 10. The regulator 10 also receives a signal from the position indicator or path tracer 9, which represents the movement and position of the tool electrode 1.

From the regulation error signal $e$ and the movement or position of the tool electrode, the regulator 10 determines and supplies the control signal for the drive 11 of the tool electrode 1.

In the case of electrode arrangements providing no possibility for direct flushing with dielectric liquid, or those in which the flow of liquid in the gap cannot be directly regulated, a periodically operating back-off control 12 is provided in the system. The back-off control 12 provides pulses to the drive 11 at predetermined time intervals such as to back off the electrode 1 briefly at regular intervals from the workpiece electrode 2. This may also be called a lift-off control.

The control stage 200 determines the reference value of the flow rate $q$ and provides this in the form of a signal over connection 201 to the flow regulator 4. Control stage 200 also controls the interpulse interval and the current pulse amplitude, acting on the pulse generator 5 over the connections 202 and 203. Over the connection 204, the control stage 200 controls the amplitude of the back-off pulse for the back-off control 12. The condition of the electroerosion machining process is readily modifiable by the operation settings which determine the magnitudes previously identified as dielectric flow rate, operating pulse amplitude and back-off pulse magnitude.

In the illustrative embodiment shown in FIG. 2, the duration or width of the operating pulse is determined by the condition of the storage device 13. The condition of the storage device 8 provides the reference value for the width of the gap 3. It may be assumed that this reference value in the storage device 8 should remain constant. These two quantities are referred to in the following description as primary operating parameters. In the logic unit 14 the pulse width and the reference value for the operating gap 3 are pre-programmed. The desired accuracy of spatial dimensions of the final product, the desired roughness of the eroded surface of the product, and the kind of erosive machining (whether it should involve much or little removal of material) may serve as criteria for the determination of the aforesaid primary operating parameters. These primary operating parameters, moreover, can be related with adjustable setting magnitudes, such as current and interpulse interval, in accordance with previously recognized relationships. These incidental programming choices, however, do not affect and are not part of the present invention.

Some further remarks are now in order for explaining the different variables of the electroerosion machining process. The regulating error $e$, which is furnished by the difference evaluation circuit 7 to the regulator 10, is provided over the branch conductor 301 to an evaluating circuit 300. At the same time, the signal which corresponds to the position and the movement of the tool electrode 1 and is provided to the regulator 10 is similarly supplied to the evaluation circuit 300 over the branch connection 302. The evaluation circuit calculates from these values at least two variables which are present as output signals on the conductors 303 and 304 respectively. These output signals represent condition magnitudes, or, more descriptively, condition index variables, which describe the characteristics or features of the electroerosion machining process in a sufficiently complete manner.

The decision stage 400 analyzes the signals respectively present on the two conductors 303 and 304 and on the basis of the result of this analysis modifies, acting through the control stage 200, the setting variables, which are furnished as signals over the connections 201, 202, 203 and 204 respectively as long as may be necessary to bring the aforesaid condition index variables to the required conditions. The synchronizing stage 500 has the task of assuring that the control operations of the evaluation stage 300, of the decision stage 400 and the control stage 200 proceed in the proper sequence.

It should now be assumed that an operating change takes place in the electroerosion installation 100. This operating change can arise as the result of the change of a process parameter or as the result of a change in the active surface area of the electrodes 1 and 2, or because of a change of the liquid flow conditions in the operating gap 3. In this case the signals representing the condition index variables on the two connections 303 and 304 between the evaluation stage 300 and the decision stage 400 do not satisfy the required operating conditions. When this occurs, the decision stage 400 begins a so-called search operation, which may be referred to as a search routine. The result of such a search routine is to cause the condition index variables, which are present in the form of signals on the conductors 303 and 304, to fulfill again the required conditions. The time course of such a search routine will now be described more fully with reference to FIGS. 3 and 4.

Figure 3A:
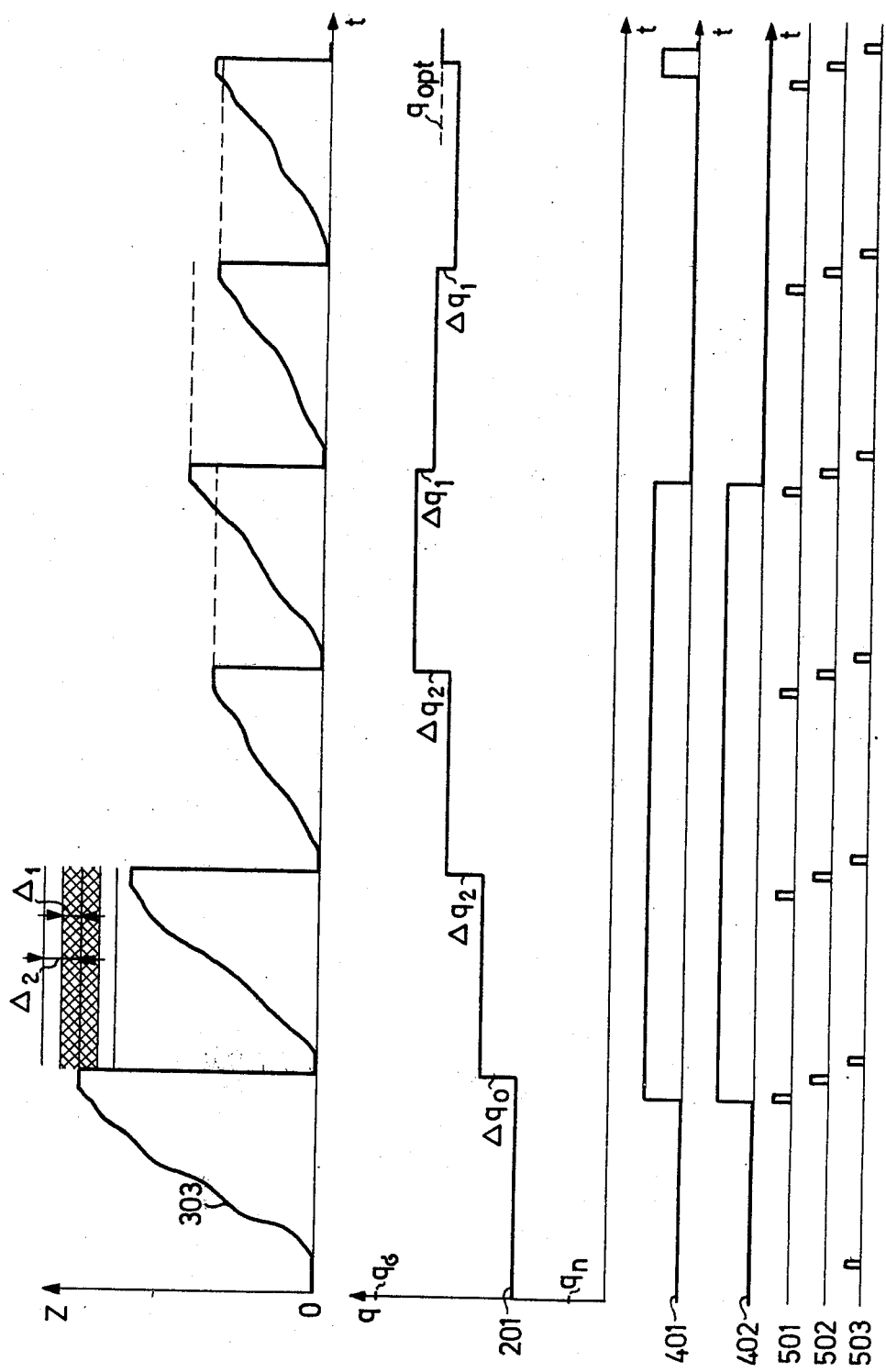
FIG. 3a is a graphicl representation of automatic searching for the optimum rate of flow of the dielectric medium in the case of an electrode system providing holes for delivery of the flushing medium to the operating gap.

In FIG. 3a such a search routine of the decision stage 400 for the setting of an optimum rate of flow $q_{opt}$ is shown with time plotted in the usual way on the horizontal axis. At the bottom edge of FIG. 3a, the timing pulses 501, 502 and 503 from the synchronizing stage 500 are shown. These timing pulses repetitively appear with a particular interval spacing between each other at a particular repetition rate. These three timing pulses are supplied over the correspondingly designated connections to the evaluation stage 300 and there control the integration of the square of the regulation error. An integration unit provided in the evaluation stage 300, but not shown in FIG. 2, is reset to its zero position by the timing pulse 502 shown in FIG. 3a. The integration unit is then started in operation by the timing pulse 503 and stopped by the timing pulse 501.

Figure 5:
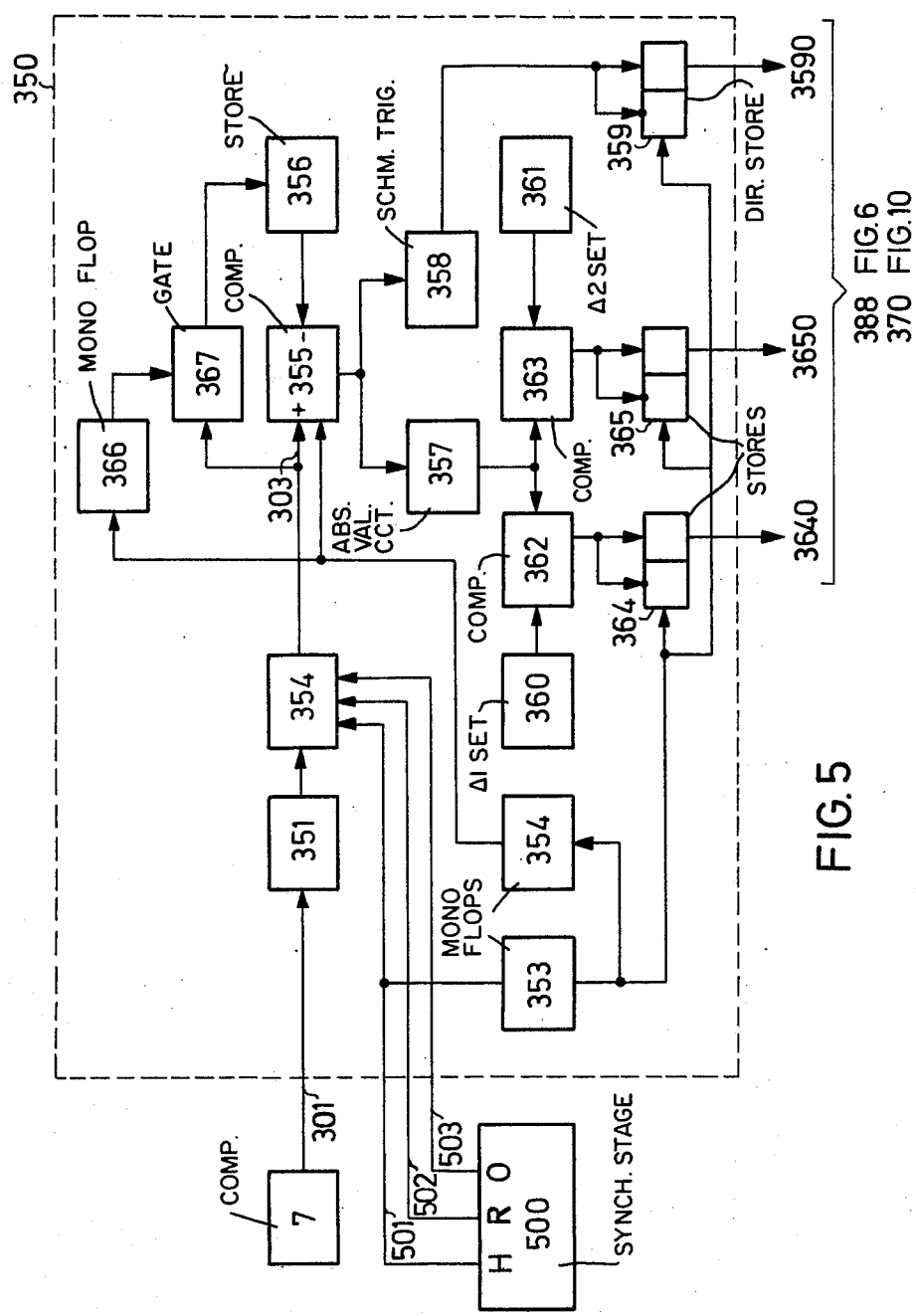

A specific example of operation will now be described with reference to FIG. 3a. The automatic search routine is initiated by a start signal not shown in FIG. 3a. In the unit 350 of FIG. 5, which is a portion of the evaluation stage 300, the signal 303 representing the integrated square of the regulation error $e$ is formed. A curve 303 in the upper portion of FIG. 3a represents the forming of this signal. In this example it will be now assumed that the regulation error $e$, that reaches the evaluation stage 300 over the connection 301 as shown in FIGS. 2 and 5, presently increases in value. In other words, that is, the regulation error becomes greater as the result of some event or other in the operating gap 3.

As shown in FIG. 3a the regulation error is detected in the unit 350 over a period until the timing pulse 501 from the synchronizing stage 500 is provided to the evaluation stage 300. It should now be assumed that upon this first one of the timing pulses 501 shown in FIG. 3a the formation of the average squared value Z of the regulation error $e$ has just taken place. It is assumed that no other average value had been formed before the operation shown in the upper left portion of FIG. 3a. When this timing pulse 501 arrives, which ends the build-up of the first average squared value Z of the regulation error in the unit 350, the signals 401 and 402 in the following decision stage 400 are changed by a fixed amount. The two signals 401 and 402 are supplied over the output connections of the dscision stage 400 to the control stage 200 and there generate a control signal, which correspondingly affects the liquid flow control 4 of FIG. 2 over the connection 201.

The signal 401 is changed from the condition 0 to the condition 1 during the presence of the first timing pulse 501, in accordance with the showing of FIG. 3a. This means that the flow rate $q$ of the dielectric medium in the operating gap 3 is to be changed in the positive direction, which is the direction of increase. The signal 402 is at the same time changed from the condition 0 to the condition 1, in accordance with FIG. 3a. This means that the change of the flow rate $q$ is to be performed with a large step. The control stage 200, which receives the signals 401 and 402, provides to the flow regulator 4 over the connection 201 a signal that rises to the extent of a certain maximum predetermined amount $\Delta q_0$. As the result of the stepwise increase of the signal in the connection 201, the flow regulator 400 increases the flow rate of the dielectric medium in the gap 3 of FIG. 2.

As shown in FIG. 3a, during the time interval between the timing pulses 501 and 502, the average squared value Z of the integrator 355 of FIG. 5 is furnished to other circuit components of the unit 350. The timing pulse 502 extinguishes the content of the integrator 355, as represented in FIG. 3a. When the timing pulse 503 arrives, the operation of integrating the square of the regulation error $e$ begins as shown in the upper part of FIG. 3a. The integration is carried on until the arrival at the evaluation stage 300 of the timing pulse 501 from the synchronizing stage 500. In the time interval between the timing pulse 501 and the next timing pulse 502, the second integration is compared with the first one. In the example of FIG. 3a this second integration is substantially smaller than the first integration. The change between the second and the first integration is indeed substantially greater than both the values $\Delta_1$ and $\Delta_2$ drawn in on the upper part of this FIG. 3a. This means that for a change of the integral which is greater than $\Delta_2$, the search routine to establish the optimum flow rate must proceed with an equally large stepsize and in the same direction. If the change in the integral is more than $\Delta_1$ but does not exceed $\Delta_2$, the search routine will proceed with a smaller stepsize but in the same direction. This will be described further at a later point.

To return now to the second intergration step in the upper part of FIG. 3a: in the time between the timing pulses 501 and 502, it is determined in the unit 350 of FIG. 5 that the difference of the second integral with respect to the first exceeds the value $\Delta_2$. In consequence the signals 401 and 402 in the decision stage 400 both remain in the same condition, their condition 1. That means that in the following control stage 200 the signal that is given to the flow regulator 4 over the connection 201 will cause the same increase $\Delta q_2$ of the flow rate of the dielectric medium in the operating gap. As soon as the timing pulse 502 reaches the evaluation stage 300, a shown in FIG. 3a, the content of the integrator is reset to 0. Upon the arrival of the timing pulse 503, the third integration operation begins to integrate the square of the regulation error, as shown in FIG. 3a. The same events now occur as already repeatedly described. The third integration operation now takes account of the increased rate of flow of the dielectric medium in the operating gap. Hence, it will no longer have so high an amplitude as the preceding two integration operations. The difference of the third integration operation with respect to the second is still greater than the previously mentioned value $\Delta_2$. That means that the flow rate $q$ will be raised by the same amount $\Delta q_2$, as already described in the case of the second integration step. A timing pulse 502 will now put an end to the third integration step by resetting the integrator 355 and passing its content to the appropriate circuit. As shown in FIG. 3a, another timing pulse 503 will now begin the fourth integration operation in the unit 355. This fourth integration operation takes account of the most recent increase of the flow rate by the amount $\Delta q_2$, as shown in FIG. 3a. It may now be assumed that this last increase of the flow rate no longer reduces the regulation error as before, but instead causes it to increase again. In this situation the signals 401 and 402 of the decision state 400 shift from their previous condition 1 to the condition 0. This means that the flow rate is to be changed in the negative direction — i.e., in the direction that reduces it — and with a smaller stepsize. During the period between the timing pulses 501 and 502 the switching over of the two aforesaid signals 401 and 402 takes place, causing the control stage 200 to reduce the flow rate of the dielectric medium in the operating gap 3 by the amount $\Delta q_1$.

Upon the arrival of the timing pulse 502 as previously described, the content of the unit 355 is cleared out and supplied to a storage device connected to the output, for later comparison. The timing pulse 503 now starts the fifth operation of integrating the square of the regulation error, now taking account of the slight reduction of the flow rate $q$.

It is now assumed, as shown in FIG. 3 that the fifth integration operation shows only a small change from the fourth one. The difference here assumed does not exceed the amount $\Delta_2$, but is greater than the value $\Delta_1$. Since the circumstances, as compared to the previous integration, have not changed, the flow rate $q$ will be reduced by the same amount as in the case of the fourth integration operation, namely by the value $\Delta q_1$.

In the case of the sixth integration operation, which of course takes account of the most recent reduction of the flow rate $q$, the difference with respect to the previous integration operation is so small, that not only the value $\Delta_2$ but also the value $\Delta_1$ are not exceeded. This means, by definition, that the search routine will be interrupted, because now, in accordance with FIG. 1a, the most favorable flow rate for the operating gap 3 has been found, this having taken place during the concurrent electroerosion machining operation. In this case the squared average value Z of the regulation error has been brought back to a minimum. In FIG. 3a this is shown by the fact that the signal 201 maintains its level $q_{opt}$ after the sixth integration operation. It should be added, finally, that this signal 201 varies between the limits $q_n$ and $q_\sigma$. These same limits of the variability range of the flow rate are shown in FIG. 1a.

Figure 3B:
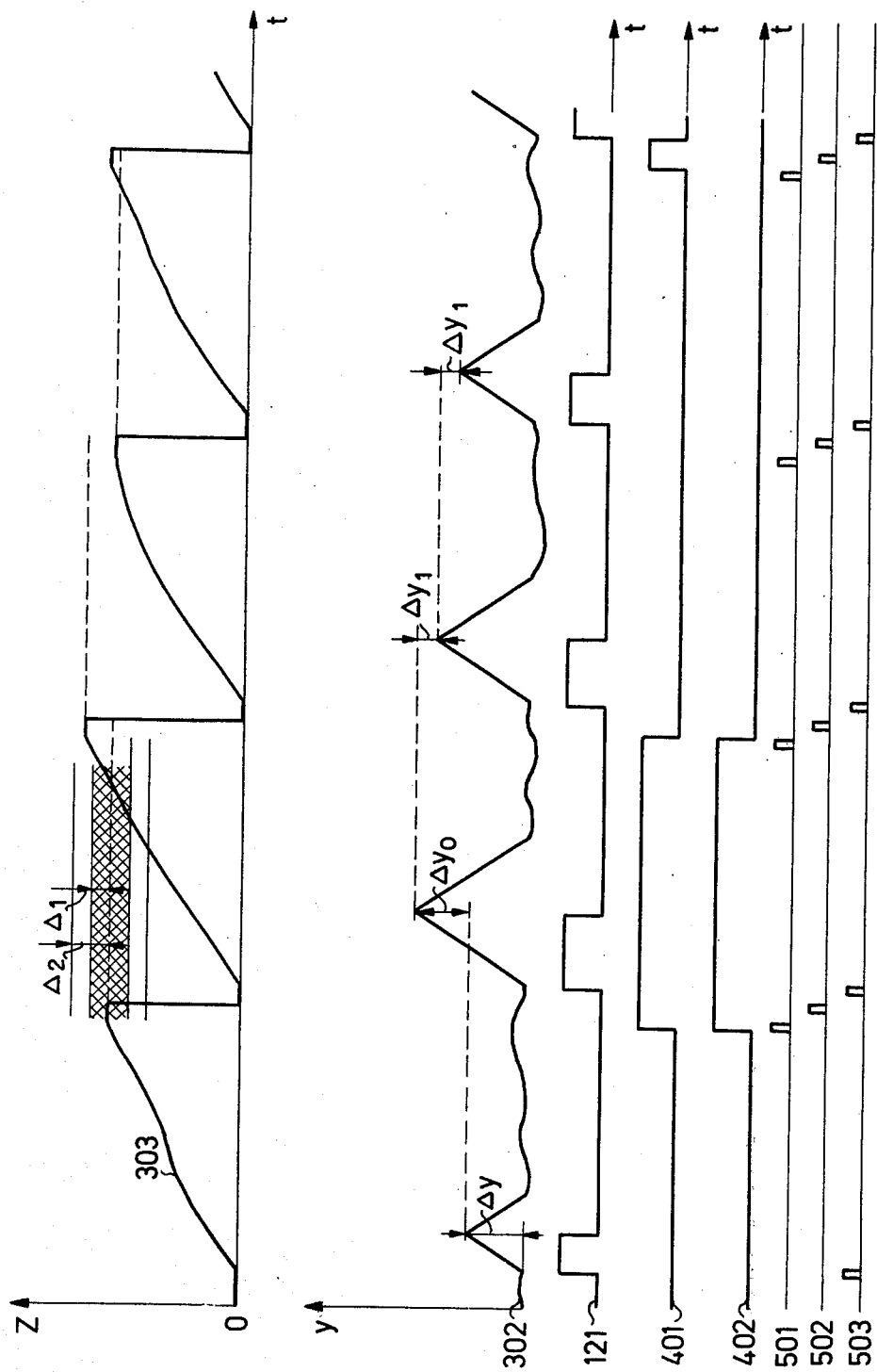
FIG. 3b is a graphical representation of searching for the optimum back-off movement in the case of a pulsed drive with periodic backing off of one of the electrodes.

In FIG. 3b a search routine is explained in which the object is to find the optimum back-off distance $y$ for the tool electrode 1. Such a search routine is necessary only if the flow rate $q$ of the dielectric medium in the operating gap 3 cannot be directly controlled in the manner described, for example, with reference to FIG. 3a. Such direct control of the flow rate $q$ is provided if, as shown in FIG. 2, the workpiece electrode 2 is provided with flushing ducts 21. A search operation will now be described with reference to FIG. 3b for finding the optimum back-off distance for the tool electrode 1. As generally known, one of the two electrodes 1 and 2 is pulled back from the other electrode at particular time intervals, in order to regulate in this manner the flow rate $q$ of the dielectric medium in the operating gap 3. It may now be assumed that the electroerosion machining process is already running and that, for example, the tool electrode 1 is periodically backed away, but only for a short time, from the workpiece electrode 2, after which the normal gap width is quickly restored. The position indicator or a path register 9 provides signals which represent the movement of the tool electrode 1 and supplies the signals over the connection 302 to the evaluation stage 300. In FIG. 3b this is indicated by the curve 302.

The so-called pulse back-off of the tool electrode 1 is brought about by causing the back-off control 12 to provide a pulse over the connection 121 to the electrode advance drive 11. This pulse is accordingly designated 121 in FIG. 3b. Not far from the ordinate axis $y$ the first pulse 121 is shown which has the effect of setting back the tool electrode 1 by the path length $\Delta y$ away from the workpiece electrode 2. The setback distance of the electrode 1 accordingly has the value $\Delta y$. This first pulse 121 is shown as representative for many pulses of the same form and and size. The normal so-called pulsed drive of the tool electrode 1 is intended to be represented by it.

After the termination of the first pulse 121, the tool electrode 1 is moved towards the workpiece electrode 2, so that the normal width of the operating gap 3 is again provided. The width of the pulse 121, which is to say the duration of its condition 1, is determined by the control stage 200 over the connection 204 which leads to the back-off control 12. In this first case it is essentially a question of a fixed predetermined value.

For the further description of the example of FIG. 3b, it will now be assumed that after a certain number of pulsing setbacks of the tool electrode 1 a search routine is initiated to find the optimum back-off distance for this electrode 1. By this routine it should be ascertained whether the optimum for the intermittent back-off of this electrode 1 has been lost or whether it is still present.

Figure 10:
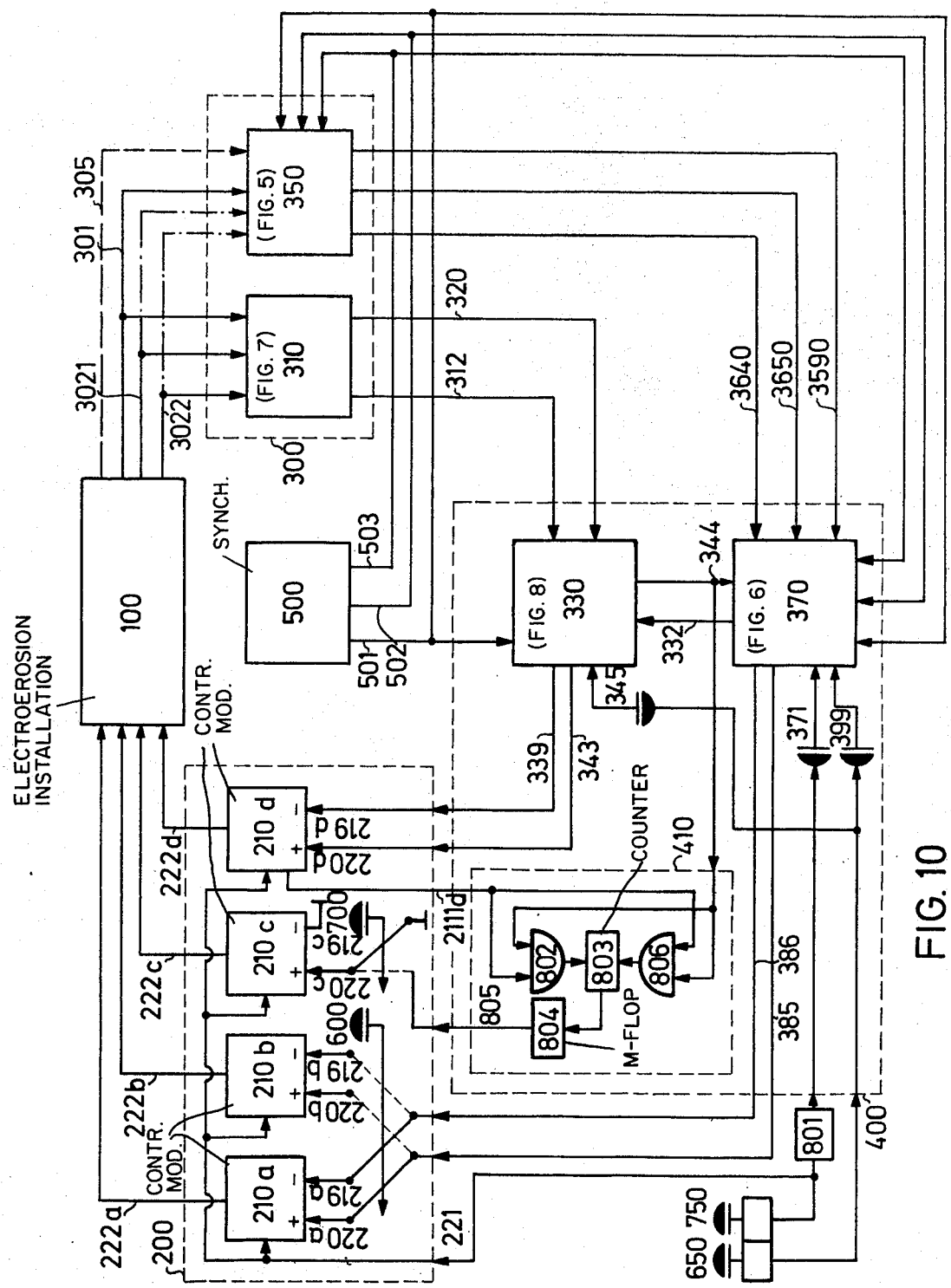
FIG. 10 is a circuit diagram mostly in block form showing the electrical connections among the components shown FIGS. 5, 6, 7, 8 and 9 and between these components and an electroerosion installation 100 that forms part of the apparatus shown in FIG. 2.

A start pulse to initiate this search routine is furnished to the decision stage 400 of FIGS. 2 and 10. This start pulse is not shown in FIG. 3b. The start signal given to the decision stage 400 of FIGS. 2 and 10 for operating over the control stage 200 of the same figures, modifies the behavior of the back-off control 12 in such a manner that the pulse provided by the latter over the connection 121 is increased by a particular amount (as shown in FIG. 3b, the increase is in the duration or width of the pulse). In accordance with FIG. 3b, both signals 401 and 402 are in their 0 condition during normal pulse operation of the tool electrode 1, but they are both switched to their 1 condition after reception of the start pulse in the decision stage 400. Although the start pulse is not specifically shown in FIG. 3b, it is clear that it occurs on or just before the first 501 timing pulse shown on the diagram. A numerical control program for the operation or response to a change in an operation parameter or a manual order may produce the start pulse.

The timing pulses 501, 502 and 503 produced by the synchronizing stage 500 are again shown at the bottom of FIG. 3b. Thus after reception of the start pulse in the decision stage 400 followed by the reception of the timing pulse 501 by the decision stage, the two signals 401 and 402 are set to their 1 condition. The meaning of these two signals, already mentioned in connection with FIG. 3a, is again discussed in detail here.

When the signal 401 is in the 0 condition, the control stage 200 recognizes the command that the movement of the tool electrode 1 is to be caused to proceed in, for example, the negative direction. When the signal 401 takes on the condition 1, this indicates to the control stage 200 that the tool electrode 1 is to be moved in the opposite direction. This order direction is in this case designated as the positive direction.

When the signal 402 is in its 0 condition, that means for the control stage 200 that the tool electrode 1 is to be moved by a small step. This movement is performed with a small step in the direction prescribed by the signal 401. When the signal 402 is in its 1 condition, that means for the control stage 200 that the tool electrode 1 is to be moved by a large step. These steps commanded by the signals 401 and 402 are actually steps in the amplitude of the backoff movement of the tool electrode 1 and they take place only during the search routine, the backoff movement keeping the same amplitude in the absence of a search routine even though signals 401 and 402 are both 0.

The position of the electrode 1 in the periods between the backoff pulses is controlled by the servo system of the electroerosion drive that keeps the tool electrode 1 advancing into the workpiece to maintain the gap condition.

If now, as already mentioned, as the consequence of the start pulse followed by the timing pulse 501 the two signals 401 and 402 are placed in their 1 condition, the control stage 200 in consequence generates the pulse 121 with a greater width than before, as shown by the second 121 pulse from the left in FIG. 3b. The back-off distance which the tool electrode 1 now moves in larger than the back-off distance $\Delta y$ of the immediately preceding periodic setback by the amount $\Delta y_0$, because by this greater back-off distance the width of the gap 3 is made larger than it was before or during the so-called periodic drive load. A change in the flow rate $q$ of the dielectric liquid in the working gap is then observable, a result that is communicated over the connection 301 to the evaluation stage 300 of FIGS. 2 and 10. This is shown in the upper part of FIG. 3b. There time is plotted as the abscissa and the integral of the average squared Z of the regulation error $e$ is plotted on the ordinate. The curve 303 shows the integration of the average squared value of the regulation error, which is provided as a signal over the connection 303 from the evaluation stage 300 to the decision stage 400.

It may now be assumed that the last mentioned back-off distance, which was greater by $\Delta y_0$ than the immediately preceding back-off distance $\Delta y$, is taken account of by the second integration. In FIG. 3b the second integration from the left shows a curve 303 which goes somewhat higher than the previous one. This means that the regulation error $e$ has become greater, which of course was not desired. The regulation error in the case of the second integration, however, became only a little greater. This appears from FIG. 3b, in that the increment shown by the comparison of the successive integrations lies between $\Delta_1$ and $\Delta_2$. The values $\Delta_1$ and $\Delta_2$ are so-called threshold values. Their effect will now be further explained.

If the second integration, for example, exceeds the first integration (i.e., the immediately preceding integration) by an amount that is more than $\Delta_2$ in either direction, that means that the back-off distance of electrode 1 is to be modified in another direction and with a large step. The two signals 401 and 402 would in such case have the conditions 0 and 1 respectively. In this case, if the second integration in FIG. 3b should have reached a level above or below both of the lines designated by the symbol $\Delta_2$, such a large step would have been commanded. It may now be assumed, however, that the second integration of FIG. 3b, which was initiated by the timing pulse 503 and ended by the following timing pulse 501, is only moderately larger than the first integration. The second integration shown in FIG. 3b lies between the previously mentioned threshold value $\Delta_2$ and the other threshold value $\Delta_1$. In such a case the direction of modification of the back-off distance will be changed and the modification in this new direction will be by a small step.

Between the timing pulses 501 and 502 of the second integration, the already described decision by the decision stage 400 takes place. These signals 401 and 402 both switch from the 1 condition to the 0 condition. Upon the arrival of the timing signal 502, the integrator 355 of FIG. 5 is again reset to 0. Before that happens, however, its content is communicated to the circuit units 357 and 358 of the unit 350 of FIG. 5. This will be described more fully at a later point in connection with FIG. 5.

Upon generation of the timing pulse 503 by the synchronization unit 500, the control stage 200, taking account of the signals 401 and 402 from the decision stage which are likewise furnished to the control stage 200, will provide a signal over the connection 204 to the back-off control 12. The backoff control 12 furnishes over the connection 121 to the drive 11 of the tool electrode 1 the pulse designated 121 in FIG. 3b. This pulse now has a smaller width than before. As already stated, the smaller width of the pulse 121 is defined by the combination of the condition of the two signals 401 and 402. The timing pulse 503 also produces in the evaluation stage 300 the beginning of the third integration shown in FIG. 3b. The tool electrode 1 is moved over a back-off distance which is smaller by the value $\Delta y_1$ than the immediately preceding back-off distance which, as shown in FIG. 3b by the curve 302.

As the result of the back-off distance of the tool electrode 1 being smaller by $\Delta y_1$, the third integration is somewhat smaller than the immediately preceding second integration. It may be assumed that the third integration, which is ended by the arrival of the timing pulse 501 and is evaluating during the period between the timing pulses 501 and 502, lies between the threshold value $\Delta_1$ and $\Delta_2$. This means that the reduced back-off distance now smaller by the value $\Delta y_1$ reduces the regulation error, as may be noted on the curve 303 showing the integration of the squared average value of the regulation error $e$. The regulation is therefore on the right path. Accordingly, the signals 401 and 402 remain in their condition 0. The pulse 502 clears the content of the integrator 355 (FIG. 5). The following timing pulse 503 starts the fourth integration operation of FIG. 3b in the evaluation stage 300 and produces the next 121 pulse, acting over the control stage 200 as well as the back-off control 12.

The drive 11 again pulls back the tool electrode 1 away from the workpiece electrode 2, but the new back-off distance has again become smaller than the back-off distance in the case of the previous integration, the third integration in FIG. 3b. Taking account of the latest back-off distance, the fourth integration proceeds to evaluation, as shown in the curve 303. The fourth integration, initiated by a timing pulse 501 and evaluated by the determining timing pulse 502 now lies somewhat higher than the third integration. The fourth integration in this example exceeds the third in height by a value that still leaves it within the range of the limiting value $\Delta_1$. This means that the search routine may now be terminated. For this reason the signal 401 of the decision stage 400 temporarily takes on the condition 1 and does so during the interval between the timing pulses 502 and 503. The signal 402 does not change its condition at all. This combination is the general criterion for the ending of the search routine. This search routine makes it possible to find an optimum back-off distance such that the average squared value Z of the regulation error $e$ reaches an optimum as explained with respect to FIG. 1a. This means that the optimum flow rate of the dielectric medium in the operating gap 3 is likewise found. The optimum flow rate holds, naturally, for the fixed settings of the inter-pulse interval $T_{01}$, $T_{02}$ or $T_{03}$ corresponding to the curves A, B and C shown in FIG. 1.

The output signal 378 of FIG. 6 which puts an end to the search routine described with reference to FIG. 3a or the one described with reference to FIG. 3b produces the start signal 372 which initiates another search routine after a very brief interval. Before this search routine is more closely described, it should be noted that as shown in FIG. 1b, the regulation error can be reduced to a minimum value by regulation affecting a periodic spatial shifting of the two electrodes 1 and 2 with respect to each other. This is possible, however, only in those cases when the curves D, E and H and hence the third coordinate values represented thereby lie within the area defined by shading and above the curve G. If some of the points representing, by their coordinate values, the conditions of operation lie below the curve G, a change of the duration of the interval between the individual operating pulses must then be brought about. As already stated, after the termination of the search routine in accordance with FIG. 3a or FIG. 3b, a new search routine is started to find the shortest usable interval length between the individual operating pulses that produce discharges across the operating gap 3. This will now be explained with reference to FIG. 4.

Figure 4:
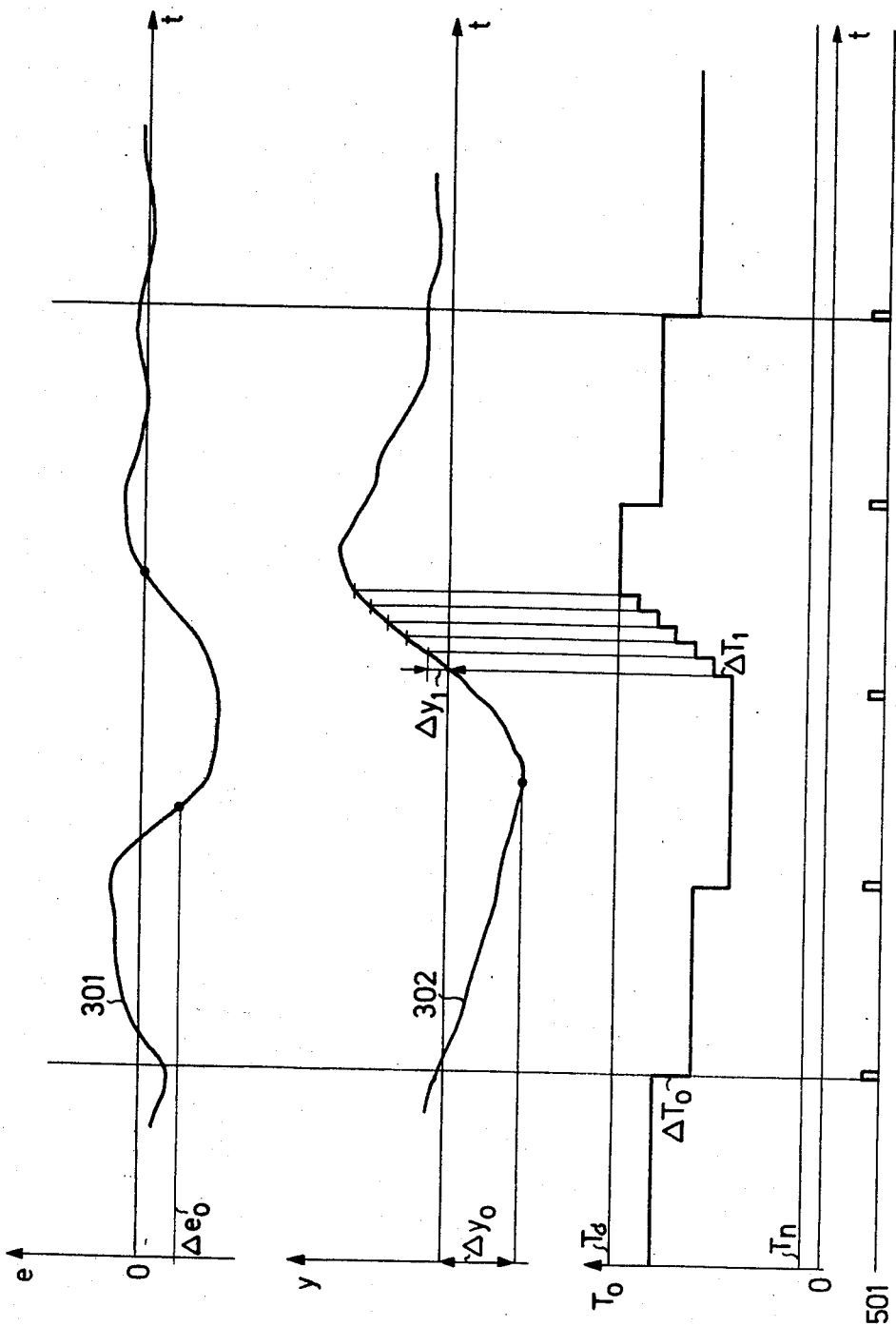
FIG. 4 is a graphical representation of the holding of the interpulse interval within operating limits.

In the upper part of FIG. 4 the regulation error $e$ is drawn as the curve 301. This curve 301, which shows the signal in the evaluation stage 300 of FIGS. 2, 5 and 10, carrying the information of the change of the regulation error, moves around the value zero. Below the zero value axis and parallel to it, is the level representing the limit value $\Delta e_o$. The meaning of this limit value will be discussed further below.

In the middle portion of FIG. 4 the curve 302 is shown, which, as mentioned several times before, shows the current position, or the current motion, of the tool electrode 1. This curve 302 represents the signal provided by the position indicator 9 to the evaluation stage 300 of FIGS. 2 and 7. The time is plotted on the abscissa, as in all the diagrams of FIG. 4, and in this case, the displacement $y$ of the tool electrode 1 is plotted as the ordinate. The meaning of the back-off displacement $\Delta y_o$ and the individual increments $\Delta y_1$ will be discussed further below.

In the bottom third of FIG. 4 is shown the signal 202 or 222d, as the case may be, which is provided by the control stage 200 of FIGS. 2 and 10 to the pulse generator 5 in order to change the duration of the intervals between the individual pulses which strike discharges in the operating gap 3. This change of the inter-pulse interval T, a value that may range between the limits $T_n$ and $T_o$, is designated as $\Delta T_o$ and $\Delta T_1$. At the very bottom of FIG. 4 are shown the previously mentioned timing pulses 501 from the synchronization stage 500 of FIGS. 2, 5 and 10.

If now the start signal 372 sets off the search routine for the smallest usable inter-pulse interval, the evaluation stage 300 then proceeds to evaluate the regulation error $e$ which is shown as the curve 301. Concurrently, the motion of the tool electrode 1, which is shown as the curve 302, is evaluated at the same stage 300. When the first timing pulse 501 from the synchronization stage 500 following the start pulse reaches the evaluation stage 300 and the control stage 200 (the decision stage 400 does not participate in this search routine), the control stage 200 then provides over the connections 202 or 222d, as the case may be, to the pulse generator 5 a signal for reducing the inter-pulse interval by the amount $\Delta T_o$. The reduction is pre-programmed in the control stage and has a fixed and pre-determined value. The regulation error now varies corresponding to the curve 301 in view of the reduced inter-pulse interval. The tool electrode 1 likewise shifts in the direction of the work piece electrode 2. This is shown by the curve 302. By this movement of the tool electrode, hence by the reduction of the width of the operating gap 3, the regulation error 301 will also tend to move towards the value zero. In this condition, the equipment is still operating above the curve G of FIG. 1b. If now a second timing pulse 501 from the synchronization stage 500 to be provided. This timing pulse 501, in accordance with FIG. 4, causes the duration of the interval between individual operating pulses to be reduced by the same value $\Delta T_o$ as was the case with the first timing pulse 501 of FIG. 4, the timing pulse again acting over the control stage 200 and the connection 202 or 222d of FIGS. 2 and 10, as the case may be. This second reduction of the inter-pulse interval evidently appears to have been too much. The regulation error $e$, after a brief increase wanders now to the zero point. The curve 301 even crosses the zero point and then also crosses the limit value $\Delta e_o$ in the downward direction. In the evaluation stage 300, measures are now taken to reduce such a rapid increase of the regulation error $e$. By means of the control stage 200 and the back-off control 12, the electrode drive 11 is caused to move the tool electrode 1 as shown by curve 302 for this instant. Since the modification of the back-off distance of the tool electrode 1 below the value $\Delta y_o$ can no longer influence the regulation error $e$, the movement of the tool electrode in the other direction is now begun, that is, away from the work piece electrode. The position indicator 9 provides the information concerning the position and the movement of the electrode as the signal 302 to the evaluation stage 300. Because the regulation error $e$ lies over the limit value $\Delta e_o$, the next timing pulse 501 (in FIG. 4, the third pulse from the left) has no effect on the control stage 200. As soon as the evaluation stage 300 recognizes that, in accordance with curve 302 of FIG. 4, the back-off distance $\Delta y_o$ has been reached, there takes place in the control stage a step-wise increase, by the value $\Delta T_1$ for each step, of the interval between the individual operating pulses. At the same time, the tool electrode 1 is moved further away from the other electrode 2. The inter-pulse interval is increased step-wise by the value $\Delta T_1$ long enough to bring the regulating error 301 to zero value. In this case, the spacing between the two electrodes 1 and 2, as shown in curve 302, continues to increase somewhat. Thereafter the spacing is reduced, however. That means, in other words, that the tool electrode 1 again moves slowly in the direction of the workpiece electrode 2.

In FIG. 4 a fourth timing pulse 501 from the synchronization stage 500 is shown. Since now the regulation error $e$ shown in the curve 301 is above the zero axis as well as above the limit value $\Delta e_o$, this fourth timing pulse again has the effect on the control stage 200 of reducing the inter-pulse interval by a specific amount $\Delta T_o$. The same occurs also with the following timing pulses 501 from the synchronization stage.

It should be noted that the regulation operation shown in FIG. 4 with the stepwise increase of the inter-pulse interval by the amount $\Delta T_1$ fixes the point of time at which the inter-pulse interval lies below the limit curve G shown in FIG. 1b. In this case, it was therefore not possible to bring the regulation error to the zero line merely by controlling the flow rate $q$ or the width of the operating gap 3. It was therefore necessary to obtain also the help available by controlling the inter pulse interval. After a certain number of timing pulses 501 the search routine to determine the smallest usable inter-pulse interval is terminated. Immediately thereafter, a start pulse is produced for the search routine to establish the optimum flow rate of the dielectric medium in accordance with FIG. 3a or the search routine to establish the optimum back-off movement according to FIG. 3b.

By this alternating sequence of searching for optimum flow rate and for optimum inter-pulse interval, it is possible to carry out the entire electro-erosion process on an optimum basis. An undesired sudden shift of the over all electro-erosion operating conditions, such as is common in known processes, is quite impossible with the method and system of the present invention. As already mentioned in the introduction, an operating condition can be shifted as the result of changes in the surface area of the electrode that takes part in the actual erosion processes, particularly in the case of complicated electrode shapes or as the result of the provision of pre-programmed operating parameters. In the process of the present invention it is possible to overcome exactly by regulation a slow shifting around of the optimum operation condition as the result of the wandering of a small active zone on a larger and broader electrode surface as the result of variable liquid flushing conditions or, in consequence, variation of the active surface area with the depth of penetration.

Circuit diagrams are described below relating to an illustrative embodiment for carrying out the process of this invention described with reference to FIGS. 1a, 1b, 3a, 3b and 4.

DESCRIPTION OF THE PREFERRED EMBODIMENTS

In FIG. 5 is shown the first circuit means 350 for generation of a signal proportional to the first condition index variable. This circuit means 350 is provided as a circuit in the evaluation stage 300 shown in FIG. 2. In accordance with FIGS. 2 and 5, the signal representing the regulation error $e$ proceeds from the difference evaluating means 7 over the connection 301 to the evaluation stage 300 and is squared in the squaring circuit 351, i.e. the value $e^2$ is formed. This squared value is provided to the integrator 352. The squaring circuit 351, like the various other circuits shown in block form by "boxes" in the drawings, such as integrators, multivibrators, storage devices, and so on, are all electronic circuits well known in the art generally made up on integrated circuit chips or the like and readily available as standard items. Such components are therefore not further described here. The timing pulses 501, 502 and 503 from the synchronization stage 500 referred to in FIGS. 3a, 3b and 4, control the operating state of the integrator 352. The timing pulse 501 terminates the integration process, as shown in FIGS. 3a and 3b. The signal 303 representing the integration is present at the output of the integrator 352 and is provided to the difference evaluating means 355, which may also be referred to as a comparator. Upon the occurrence of the next timing pulse 502, the content of the integrator 352 is reset to 0 and prepared for the next integration. The next timing pulse 503 begins a new integration of the squared regulation error $e^2$. The integral of the value $e^2$ is repeatedly calculated during the period defined by the timing pulses 503 and 501 and is provided as the signal 303 at the output of the integrator 352 both to the difference evaluating means 355 and to the storage device 356. This will now be described more closely.

In the period between the timing pulses 501 and 502 the value of the integral at the output of the integrator 352 is analyzed as follows: in accordance with FIG. 5 the timing pulse which, as we have seen, ends the integration process which has up to then been running, and is not given directly from the synchronization stage 500 to the integrator 352, but rather over the monostable multivibrators 353, 354 and 366, for the control of three functions. These three functions are the following: the timing pulse 501 coming out of the monostable multivibrator 353 clears the content of the storage devices 364 and 365 so that these storage devices are prepared for the evaluation of the integration operation. This timing pulse at the same time also reaches the monostable multivibrator 354 and after a certain delay reaches the second input of the difference evaluation means 355. The timing pulse 501 out of the monostable multivibrator 354 causes the difference evaluation circuit to compare the integrator signal which has already been read into this circuit over the connection 303 with the immediately preceding integrator signal that was stored in the storage device 356. The difference is thus determined between the new and the old integrator signal. Further processing of the signal thus formed of the difference between the two integration operations will be further described below. The third function of the timing pulse 501 must first be pointed out. Simultaneously with the forming of the difference signal in the difference evaluating means 355, the timing pulse 501 reaches the monostable multivibrator 366. After a certain time delay, the output signal from this monostable multivibrator 366, which is a delayed signal corresponding to the timing pulse 501, opens the gate circuit 367. The integration signal 303, which is still present at the output of the integrator 352, can now proceed through the gate circuit 367 to the storage device 356. The signal stored in this storage device serves for the forming of the difference with reference to the next integration operation in time sequence. The next timing pulse 502 resets the integrator 352 to 0.

The timing pulse 503 begins the next integration operation in the integrator 352. This has been described in detail in connection with FIGS. 3a and 3b, so that at this place it is not necessary to go further into the matter. We may now return to the further processing of the difference which was formed in the difference evaluating circuit 355 between the integration operation ended by the timing pulse 501 and the previous integration operation stored in the storage device 356. This difference signal is present at the output of the difference evaluating means 355 and is provided to the unit 357 for forming the absolute value of the difference magnitude and to the unit 358 for representing the direction of the difference. The unit 358, which in this illustrative embodiment is in the form of a Schmitt-trigger, provides its sense (direction) signal, characterizing the difference, to the storage device 359. This storage device 359 has been prepared for receiving this signal by the timing pulse 501 from the monostable multivibrator 353. The unit 357, in which the amount (absolute value) of the difference is formed provides its output signal to the two comparators 362 and 363. In these two comparators the absolute value of the difference is compared with two constant $\Delta 1$ and $\Delta 2$. These two constants are provided in the units 360 and 361.

As already repeatedly mentioned in connection with FIGS. 3a and 3b, the constants here referred to are the threshold values $\Delta 1$ and $\Delta 2$. If now the amount of the difference is smaller than $\Delta 1$ and $\Delta 2$, the comparators 362 and 363 communicate a zero condition to the storage devices 364 and 365 respectively. This zero condition in both storage devices 364 and 365 signifies the termination of the search routine as already described in detail in connection with the two FIGS. 3a and 3b. For completeness it should also be mentioned that the two storage devices 364 and 365 are previously prepared by the timing pulse 501 in the same way as the direction store 359.

If now the amount of the difference is greater than $\Delta 1$ but smaller than $\Delta 2$, the storage device 364 is set in the condition 1 and the other storage device 365 is set in the 0 condition. This means, as already stated in connection with FIGS. 3a and 3b, that the search routine will continue with small steps in the change of the flow rate. If the amount of the difference is greater than both $\Delta 1$ and $\Delta 2$, both of the storage devices 364 and 365 are placed in the condition 1. That means, as already mentioned before, that the search routine is to proceed with large steps in the difference of the flow rate. The direction of the change of the flow rate is defined by the direction store 359. The described output signal of the three storage devices 364, 365 and 359 of FIG. 5 proceed to the logic circuit 388 provided in the circuit assembly 370. The circuit assembly 370 is provided within the decision stage 400, as shown in FIGS. 2 and 10, and is shown in detail in FIG. 6.

Now back to FIG. 5. When the storage devices 364, 365 and 359 have provided their output signals to the logic circuit 388, the third function of the timing pulse 501 is then performed. By this third function the content of the integrator 352, which is present as signal 503, is transmitted through the now opened gate circuit 367 to the storage device 356. This instantaneously present content of the integrator 352, which is there as the signal 303, is simply transferred and made the content of the storage device 356. The subsequent timing pulse 502 extinguishes the instantaneous content of the integrator 352. When the next timing pulse 503 reaches the integrator 352, the next integration is begun. The processing of this integration operation and the comparison with the previous integration operation as well as the formation of the output signals of the storage devices 364, 365 and 359, then proceed in the same way as already described.

Figure 6:
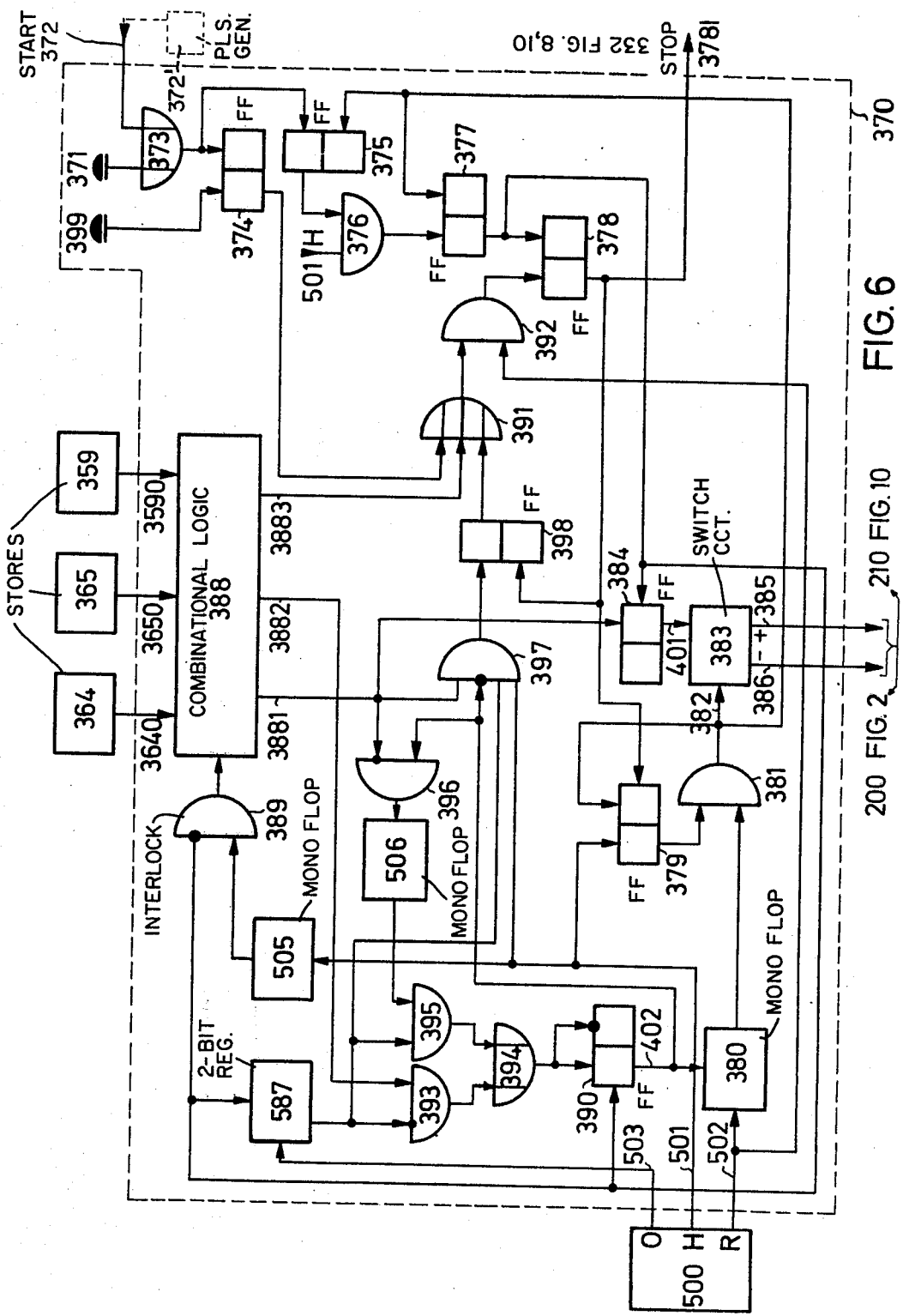

In FIG. 6 is shown in detail the circuit assembly which forms the stage following the first circuit means 350 of FIGS. 5 and 10. In this circuit assembly, the search routine is carried out which was described in connection with FIGS. 3a and 3b. The circuit assembly 370 is located in the decision stage 400 of FIGS. 2 and 10.

On the connections 3640, 3650 and 3690 to the storage devices 364, 365 and 359 of FIG. 5 are signals or conditions which correspond to the evaluation of differences between the individual integration operations and which have been described at great length in connection with FIG. 5. The manner of operation of the circuit assembly shown in FIG. 6 will be described with reference to some examples of FIGS. 3a and 3b. It should be assumed that a start pulse is produced on the connection 372 for beginning the evaluation operation. The generation of this start pulse, which is not shown in FIGS. 3a and 3b, but has been mentioned several times in the description of these figures, can be made dependent upon some electrical parameter if such an electrical parameter is modified in the electroerosion pulse generator 5. This change can be brought about either by an operator or by a particular program of a numerical control system. The latter case is represented by the source 372' of search routine start pulses shown in dashed lines, which may be a source of periodic pulses, a source of pulses responsive to change of operating condition, or both. In such a case the start pulse will be transmitted on the connection 372 to the OR-gate 373. Obviously it is also possible for the operator to produce a start pulse himself by pressing the button 371. In both cases the start pulse proceeds over the OR-gate 373 to the bistable circuit 374. This pulse also proceeds to the bistable circuit 375 which is constituted in the usual flipflop form and sets it in the 1 condition. As soon as the first 501 timing pulse from the synchronizing stage 500 arrives, the bistable circuit 377 is set in its 1 condition over the AND-gate 376, as shown in FIG. 6. The timing pulse, of course, is from the sequence of timing pulses shown in the lower part of FIGS. 3a and 3b. The 1 condition of the flipflop 377 signifies that the first change of the flow rate $q$ of the dielectric medium in the operating gap or, as the case may be the first change of the back-off distance $y$ of the tool electrode 1 is to be brought about. The following operations are set in motion by the state 1 of the flipflop 377:

a. The bistable circuit 378 is reset to its 0 state, whereby the bistable circuit 379 is prepared for operation; the function of the bistable circuit 379 is the establishment and interruption of the connection between the monostable multivibrator 380 and the switching device 383. This will be described further at a later point. It only needs to be stated here that the state of the bistable circuit 379 establishes or interrupts the aforesaid connection from time to time. The condition of the bistable circuit 379 is controlled by the timing pulses 501 and 502.

b. A further result of the 1 condition of the bistable circuit 377 is the setting of the bistable circuit 384 in its 1 condition. This bistable circuit 384 has the function to direct the signals from the monostable multivibrator 380 already mentioned to either one or the other of the output conductors 385 or 386 of the switching device 383 according to which of its two states the bistable circuit 384 is in at the particular time. For completeness it should further be mentioned that the output of this bistable circuit 384, designated as 401, always has the complementary condition or state relative to that of the bistable circuit 384 itself, as this circuit is controlled by the combinational logic unit 388 (output 3881).

c. As a further result of the 1 condition of the flipflop 377, the bistable circuit 390 is set in its 1 condition. The function of this bistable circuit 390 is to condition the monostable multivibrator 380 in such a way that this monostable multivibrator 380, upon the arrival of the timing pulse 502 from the synchronizing stage 500 will produce a pulse of longer duration if the condition 1 of the bistable circuit 390 is present on the output connection 402, but will produce a pulse of shorter duration if the condition 0 is present on the output connection 402 of the multivibrator 380.

d. The 1 condition of the flipflop 377 also causes the content of the two place register 387 to be emptied. This two place register 387 is thereby reset to 0.

e. The 1 condition of the flipflop 377 is also furnished to the inverting input of the interlock circuit 389. This interlock circuit serves to prevent the combinational logic circuit 388 from producing any output signals.

The various operations just described are produced by the first timing pulse 501 of FIGS. 3a and 3b in the circuit assembly 370 of FIG. 6. The trailing edge of the timing pulse 501 sets the bistable circuit 379 in its 1 condition. This 1 condition is communicated to one of the inputs of the AND-gate 381. If now the timing pulse 502 from the synchronizing stage 500 is provided as the next pulse, the multivibrator 380 transmits a pulse to the other input of the AND-gate 381 with a specifically long time duration. This specific long time duration results from the 1 condition of the bistable circuit 390, the state of which is communicated by the connection 402 to the multivibrator 380. The AND-gate 381 provides a pulse over the connection 382 which is directed in the switching device 383 to the output conductor 385, because the bistable circuit 384 and hence also the connection 401 are in the 1 condition. At this point it should be mentioned that the output connections 401 and 402 of the bistable circuits 384 and 390 correspond identically with the signals 401 and 402 of FIGS. 3a and 3b. The pulse of long time duration that is imposed on the output connection 385 of the switching device 383 is interpreted by the control stage 200 of FIGS. 2 and 10 to which it is furnished in such a way as to change the flow rate $q$ by a large step $\Delta q_o$ in the positive direction. The positive direction signifies an increase of the flow rate. This is shown in FIG. 3a.

The signal on the connection 385 of FIG. 6 is utilized in accordance with FIG. 3b by causing the control stage 200 to control the movement of the tool electrode 1 to the same effect. The back-off control 12 receives a control pulse over the connection 204 and transmits to the electrode advance drive 11 the pulse 121 which is produced in accordance with FIG. 3b, not upon the arrival of the timing pulse 502 but at a later point of time. This last circumstance involves only the normal delay in the back-off control 12. In FIG. 3a the control signal 201, which is to modify the flow rate $q$, is coupled with the timing pulse 502 for sequencing.

Now back to FIG. 6. The trailing edge of the pulse on the connection 382, which is not identical with the trailing edge of the timing pulse 502, resets the bistable circuit 379 and thereby also the bistable circuits 377 and 378 to their 0 condition. By this operation the first change of the flow rate $q$, or of the displacement $y$ of the workpiece electrode 1, as the case may be, by a fixed and predetermined amount in the positive direction is brought to a close.

As the next example, a search routine will be described with reference to FIG. 6 which is performed after the second integration operation in accordance with FIGS. 3a and 3b. As explained in connection with FIGS. 3a and 3b, the difference between the first and second integration operation in this case is greater than both of the threshold values $\Delta 1$ and $\Delta 2$. This is reflected in the first circuit means 350 of FIG. 5 in the following code: condition 1 in store 364, condition 1 in store 365 and condition 1 in store 359. These conditions are transmitted over the output connections 3640, 3650 and 3590 to the combinational logic circuit 388 of the circuit assembly 370 of FIG. 6. Because the second integration operation has been terminated by the timing pulse 501, at this time the interlock circuit 389 in the circuit assembly 370 is opened by the timing pulse 501 over the delay circuit 505. This has the effect that the conditions communicated at the inputs of the combinational logic circuit 388 are distributed to the corresponding outputs. In this example the condition 0 is present at the output 3881 of this combinational logic circuit 388. This condition is transmitted to the bistable circuit 384 and sets the latter in the same condition. The output connection 401, however, according to the definition previously given must always have the complementary condition. That means in this case, therefore, the 1 condition, so that at a later point in time, when the timing pulse 502 appears, a signal can be transmitted on the output connection 385 which as already stated produces a change of the flow rate or of the displacement of the tool electrode 1 in the positive direction.

The 0 condition of the output connection 3881 of the combinational logic circuit 388 also proceeds to the AND-gates 396 and 397. These gate circuits are not effected by the 1 condition. At the same time the condition 1 appears at the upward 3882. This condition produces an outward signal (condition 1) in the AND-gate 393, acting through the OR-gate 394 to set the bistable circuit 390 in the 1 condition. This effect results because the second storage place of the register 387 is not yet occupied. In accordance with FIGS. 3a and 3b, only a single pulse 503 has reached the register 387 and it has been able to occupy only the first storage position of the register. Since the particular input here involved of the AND-gate 393 is an inverting input, the combination of the 0 condition at the output of the register 387 and the 1 condition on the output connection 3882 produces a 1 condition that is furnished over the OR-gate circuit 394 to the bistable circuit 390 which is now set in its 1 condition. At the same time as the conditions just described at the two outputs already mentioned, a 0 condition is produced at the outpt 3883 of the combinational logic circuit 388. This output changes nothing at the OR-gate 391. This gate circuit is responsible for ending the search routine.

As soon as the next 502 timing pulse appears, in accordance with FIGS. 3a and 3b, the FIGS. 401 and 402 are correctly set. At the output 385 there accordingly appears a pulse with a long time duration. The control stage 200 now provides control signals for modifying the flow rate $q$ by the amounts $\Delta q_2$ of for modifying the back-off displacement $y$ of the dual electrode by the amount $\Delta y_o$. These signals are designated 201 and 121 in FIGS. 3a and 3b. The same signals are also designated in FIG. 2. When the timing pulse 503 arrives right afterwards, one of the consequences is that in the circuit assembly 370 of FIG. 6, the second place in the register 387 becomes occupied. If now, as a result of the following integration operation, the difference between two successive integrations is greater than the threshold value $\Delta 1$ and smaller than the other threshold value $\Delta 2$, then the output connections of the first circuit means 350 of FIG. 5 will have the following conditions: output 3640 in condition 1, output 3650 in condition 0, output 3590 in condition 0. These conditions are transmitted in the usual way to the circuit assembly 370 of which FIG. 6 is the diagram. In the combinational logic circuit 388 a corresponding code is set up, because the interlock circuit 389 is unlocked by the timing pulse 501. The output connection 3881 then receives the condition 1. The output connection 3882 receives the condition 0. The output connection 3883 receives the 0 condition. The bistable circuit 384 is accordingly set in the 1 condition. The complementary output 401 accordingly receives the 0 condition, so that the output connection 386 of the switching device 383 can be seized by the corresponding control pulse.

The bistable circuit 390 is closed by the condition of the output 3882 of logic circuit 388 to be put in its 0 condition. The OR-gate 391 is not affected by the 0 condition of the upward 3883. If now the timing pulse 502 from the synchronizing stage 500 is transmitted as the next pulse, the multi-vibrator 380 produces a pulse of smaller duration. This pulse is transmitted over the AND-gate 301, which is held open by the bistable circuit 379, to the output connection 386 of the switching device 383. The signal on the output connection 386 is utilized by the control stage 200 to provide the control signal 201 or 121 for producing a smaller change of the flow rate $q$ or of the backoff displacement $y$, respectively, with a change of direction. This is shown in FIGS. 3a and 3b.

The search routine finally, is stopped when the difference between two successive integration operations is smaller than both threshold values $\Delta 1$ and $\Delta 2$. In this case the following code is placed on the output connections 3640, 3650 and 3590 of the first circuit means 350 of FIG. 5: Output 3640 in condition 0, outut 3650 in condition 0, output 3590 in condition 0. This code closes the combinational logic circuit 388 to put its output 3883 in the 1 condition. When the next 502 timing pulse appears the AND-gate 392, which receives the timing pulse at one input and the condition 1 from output 3883 over the OR-gate 391, provides an output signal to the bistable circuit 378 which sets the latter in its 1 condition. This means that a stop signal 378 is transmitted. This signal is communicated over the connection 332 to the unit 330 shown in FIG. 10. As the result of this stop signal, the search routine for the optimum interpulse interval is now performed in accordance with FIG. 4 with the assistance of the unit 330 of FIG. 10. At this point it should further be mentioned that the minimum of the first condition index variable has now been reached, as designated in FIG. 1. It finally should also be mentioned that the operator can terminate the search routine just described for the optimum flow rate at any desired time by means of the manual switch 399 shown in FIG. 6.

With reference to FIGS. 5 and 6, the formation and evaluation of the first condition index variable and the resulting control of the electroerosion machining process has been explained. The first condition index variable is produced in a manner dependent upon the rate of flow $q$ of the dielectric medium passing through the operating gap 3, or dependent upon the interval between successive pulses discharging through the operating gap, or dependent upon the keying ratio or duty cycle or upon the repetition frequency and the amplitude of the operating pulses. The first condition index variable is, in the example described, the integral of the square of the regulation error $e$, which is formed over a definite time period. It is of substantial significance in the case of this invention, however, that a condition index variable is produced and in particular another variable likewise dependent on the rate of flow $q$ of the dielectric medium flowing through the operating gap 3, or dependent on the interval between operating pulses discharging through the operating gap or dependent upon the keying ratio or duty factor or on the repetition frequency and on the amplitude of the operating pulses. This second condition index variable is defined as the breakdown potential or nominal breakdown potential of the operating pulses discharging through the operating gap 3. By breakdown potential should be understood the relation between the change of the regulating error $e$ to the corresponding change of the spacing between the electrodes 1 and 2. Since this relation is a measure of dielectric strength, it may be expressed as a breakdown potential. This second condition index variable, defined as a breakdown potential, is evaluated in a second circuit means 310 of the evaluation stage 300. The two condition index variables influence the decision stage 400 and the control stage 200 in such a way that the operation settings which must be established for operation of the erosion apparatus 100 are so controlled that the first condition index variable reaches an extreme value during the erosion operation, for example a minimum value, and the second condition index variable is held within an assigned region defined by at most two limit quantities. In the example described in FIGS. 1a, 1b, 2, 5 and 6, the settings are so controlled that the first condition index variable took on its smallest extreme value. It will readily be understood that the operation settings can be so controlled in another embodiment that the first condition index variable must always be put to its greatest extreme value (maximum) in order for the electroerosion machining process to operate under optimum conditions. The second condition index variable and its effect on the combined regulation system will now be described more closely with reference to FIGS. 7 and 8.

In FIG. 7 the second circuit means 310 is shown which is located in the evaluation circuit 300, as shown in FIGS. 2 and 10. This second circuit means receives the regulation error $e$ over the connection 301. This regulation error, which indicates the condition in the operating gap 3, is furnished, as shown in FIG. 2, over the circuit assemblies 6 and 7 and over the connection 301 both to the first circuit means 350 and to the second circuit means 310 of the evaluation stage 300. The evaluation performed in the first circuit means has already been described in connection with FIG. 5. The evaluation performed in the second circuit means 310 is now to be considered with reference to FIG. 7.

The regulation error $e$ proceeds over the connection 301 to a Schmitt-trigger 311. This Schmitt-trigger 311 which is one form of toggle circuit has an adjustable hysteresis, the value of which is set by the unit 312. It may be assumed that the value $\Delta e_0$ has been set in the unit 312. If now the regulation error $e$ as supplied from the unit 7 exceeds this limit value $\Delta e_0$, the Schmitt-trigger 311 produces the condition 1 at its output connection. The bistable circuit 313 is hereby likewise placed in its 1 condition, so that the integrator 314 is ready for reception of the output pulse of the AND-gate 315.

The displacement indicator 9 of FIGS. 2 and 7 produces output pulses or signals on the connection 302 or on the connections 3021 and 3022 of FIGS. 7 and 10 corresponding to the movement of the tool electrode 1. In FIG. 2 only one connection 302 between the displacement indicator 9 and the evaluation stage 300 is shown. In reality, the two connections 3021 and 3022 of FIGS. 7 and 10 are involved. On one of these, the connection 3021, the displacement indicator 9 provides an output condition that corresponds to the direction of movement of the tool electrode 1. If for example the tool electrode 1 is moved away from the workpiece electrode, the connection 3021 has the condition 1. If the tool electrode 1 moves towards the workpiece electrode 2, the connection 3021 has the condition 0. The other connection 3022 transmits the individual pulses of the displacement indicator 9 to the second circuit means 310. The displacement indicator 9 may for example have a path pulse transmitter which will provide a pulse for every movement of the tool electrode 1 over a particular specific distance. It should be assumed that the regulation error $e$ should not exceed the limit value $\Delta e_0$. That means in this case that the change of the flow rate $q$ by some value $\Delta q$ in accordance with FIG. 3a or that the periodic brief separation of the tool electrode 1 from the workpiece electrode 2 in accordance with FIG. 3b by the value $\Delta y$ is sufficient to keep the regulation error $e$ small or to keep the regulation error within some range so that an optimum operating behavior of the erosion process is maintained. In this case the AND-gate 315 of the second circuit means 310 of FIG. 7 is blocked, because the Schmitt-trigger 311 has the condition 0 at its output. The output signals on the connections 3021 and 3022 of the displacement indicator 9 which are produced by the periodic backing off of the tool electrode 1 with the displacement $\Delta y$, remain unused. At the output connection 321 of the second circuit means 310, the 0 condition is present. The same condition also appears at the other output connection 320, because the AND-gate 319 is blocked. This means that the circuit 330 of FIG. 8, which will be further explained later, modifies the interval between the individual operating pulses in the gap 3, and thus reduces the interval duration in the case presently under consideration. The efficiency of the electroerosion machining is thereby increased, and this is accomplished up to the point at which the regulation error can increase as the result of intervals that are too small.

The circuit assembly 330 of FIG. 8 is set into action by the stop signal 3781 produced by the bistable circuit 378 of FIG. 6 after completion of the search routine in accordance with FIGS. 3a and 3b. This stop signal proceeds to the input connection 332 of the OR-gate 333 of the circuit assembly 330 of FIG. 8. The signal on the connection 332 produces the condition 1 in the bistable circuit 334. It will readily be seen that the circuit assembly 330 can also be placed in operation by an operator by manipulation of the start button 331. The condition 1 of the bistable circuit 334 is present at one input of the AND-gate 335. If now the timing pulse 501 from the synchronizer 500 (FIGS. 2 and 10) reaches the other input of this AND-gate 335, the bistable circuit 336 will be set in the 1 condition. This condition appears at one input of the AND-gate 338. The adjacent input of the same gate receives the timing pulse 501 over the delay circuit 340 and is opened by this delayed pulse, for at the inverting input provided by the connection 321 the AND-gate 338 likewise receives the condition 1. A pulse then proceeds over the output connection 339 of the circuit assembly 330 of FIG. 8 and of FIG. 10 to the control stage 200 for shortening the interval between the operating pulses by the amount $\Delta T_0$. This change of the interpulse interval is shown in FIG. 4. In the upper part of FIG. 4 the change of the regulating error $e$ over the period $t$ is shown. On the ordinate the limit $\Delta e_0$ is shown at a definite distance from the zero line.

In the middle portion of FIG. 4 the movement of the tool electrode with respect to the time $t$ is shown. This will be further explained at a later point. For the present explanation of FIGS. 7 and 8, the bottom portion of FIG. 4 is important. It may there be recognized that after the start signal (not shown in FIG. 4, but appearing on the input connection 332 of FIG. 8) and the arrival of the timing pulse 501 (first pulse from the left), the interpulse interval is reduced by the amount $\Delta T_0$. The arrival of the second timing pulse 501 also causes the same reduction of the interpulse interval, that is, a reduction by the amount $\Delta T_0$. The reason for this is visible from the curve 301, that shows that the regulation error $e$ is subject only to insignificant changes around the zero line. FIG. 4 shows, however, that this second reduction of the interpulse interval was clearly too much, because now the regulation error $e$, as shown in curve 301, moves right across the zero line. As already described in more detail in connection with FIGS. 3b, 5 and 6, the attempt is then undertaken to slow down the tendency of the regulation error $e$ to change. The tool electrode 1 is pulled back from the workpiece electrode 2 by a large amount, as is shown in the middle portion of FIG. 4 by the curve 302. Because this effort is ineffective to arrest the trend of the regulation error by increasing the back-off displacement in the movements of the tool electrode 1, the regulation error crosses over the limit value $\Delta e_0$ as shown by curve 301 of FIG. 4. This signifies that now the interval between the operating pulses must again be increased, which is indicated in the lower portion of FIG. 4 as step stages of the amount $\Delta T_1$. The tool electrode 1 now moves closer to the workpiece electrode 2 and reduces stepwise the back-off displacement. Each step is designated with the value $\Delta y_1$. The interpulse interval is changed in this way until the regulation error $e$ crosses the zero line (curve 301). In the bottom portion of FIG. 4 the timing pulses 501 are shown that initiate the search routine for finding the optimum interpulse interval. The optimum interpulse interval, which can lie between the limits $T_n$ and $T_\sigma$, is sought in coincidence with the optimum flow rate $q_{opt}$.

The operation routine of FIG. 4 is now to be described more closely with reference to FIGS. 7 and 8. Let it be assumed that the regulation error $e$ present on the connection 301 has just exceeded the limit value $\Delta e_0$. The Schmitt-trigger 311 produces at its output the condition 1, so that the bistable circuit 313 and one input of the AND-gate 315 are put in the 1 condition. The integrator 314 is thereby switched into readiness. This integrator 314 integrates the output pulse of the AND-gate 315 and provides this pulse to the difference circuit 316. The displacement indicator 9 now provides the condition 1 on the connection 3021 of FIGS. 7 and 10 in accordance with curve 302 of FIG. 4, because the tool electrode 1 has a larger back-off displacement from the workpiece electrode 2. On the connection 3022 of the displacement indicator 9 the pulses relating to the individual increments of displacement proceed to the other input of the AND-gate 315. By definition the displacement indicator 9 provides one pulse for every unit of displacement of the tool electrode 1. These pulses corresponding to the executed displacement are added in the integrator 314 and provided to the difference circuit 316, which compares the integrated value with the quantity $\Delta y_0$ which has been set in. The so-called back-off pulses of the displacement indicator 9 on the connection 3022 proceed to one input of the AND-gate 319. This AND-gate is opened only when the Schmitt-trigger 318 provides the condition 1 to this gate circuit. That occurs only when the difference circuit 316 has ascertained that the integrated value produced by the integrator 314 is larger than the fixed setting value $\Delta y_0$. It should now be assumed that this is the case. The back-off pulses now proceed to the lowermost circuit 319 on the connection 320.

We now have the case that is described in FIG. 4 shortly before the arrival of the third timing pulse 501. For completeness it should be mentioned that this timing pulse 501 cannot be effective in the circuit 330 of FIG. 8.

The condition 1 on the connection 321 and the back-off pulses on the connection 320 have the effect that the AND-gate 338 is blocked and the AND-gate 337 is opened. Each of the back-off pulses on the connection 343 of FIGS. 8 and 10 has the effect that in the control stage 200, the interpulse interval is increased by the amount $\Delta T_1$. At the same time the first circuit means 350 with the cooperation of the circuit 370 of the decision stage 400 and the cooperation of the control stage 200 modifies the back-off displacement of the tool electrode 1 by the amount $\Delta y_1$. The interpulse interval is increased by the second circuit means 310 and through the circuit assembly 330 of FIGS. 7 and 8 for so long as necessary to bring the regulation error $e$ below the limit value $\Delta e_0$ and to set it drifting in the direction of the zero line, as shown on FIG. 4. The Schmitt-trigger 311 then has the 0 condition on its output connection, so that the back-off pulses of the displacement indicator 9 on the connection 3022 no longer can be integrated in the integrator 314, because the bistable circuit 313 has likewise taken on the 0 condition. The Schmitt-trigger 318 switches to the 0 condition, so that the AND-gate 319 is blocked. A 0 condition is now present on the connection 321. There are no pulses present on the connection 320. This means, as already described in detail, that a reduction of the interpulse interval by the amount $\Delta T_0$ will be produced by each arrival of a timing pulse 501. This pulse arrives over the connection 339 of FIGS. 8 and 10 at the control stage 200 for reduction of the interval between the individual operating pulses.

The circuit assembly 330 in FIG. 8 has already been described to a great extent in connection with FIG. 7. For completeness it should be mentioned that the reductions by the amount $\Delta T_0$ in the interpulse interval are counted in the counter 341 of the circuit 330. These stepwise reductions of the interpulse interval can thus be carried out only in a particular quantity and indeed only until this counter 341 transmits an overflow signal to the AND-gate 342. The bistable circuit 336 is thereby reset to the 0 condition. The stepwise increase of the interpulse interval by the amount $\Delta T_1$ is not dependent on the counter 341, but only on the regulation error $e$. The end of the search routine for the interpulse interval is accordingly announced when a stop signal is present at the output connection 344 of the circuit 330 of FIG. 8, which makes known to the two other circuit assemblies 370 and 410 of the decision stage 400 of FIG. 10 the termination of the search routine for the optimum interpulse interval. The circuit assembly 330 of FIG. 8 also has a manual switch 345 which can be actuated by the operator to terminate the search routine. After the termination of this search routine for the interpulse interval, a new search routine for the optimum flow rate or for the optimum back-off displacement of the periodic setback of the tool electrode 1 is initiated.

By the described cooperation of the individual search routines in accordance with FIGS. 3a, 3b and 4, it is possible during the progress of the electroerosion machining process to set the first condition index variable at its smallest value and at the same time to maintain the second condition index variable within its prescribed range. This takes place in spite of changes of the operating parameters during operation, which changes as is well known influence each other mutually and cause deterioration of the efficiency of operation. In the case of the invention, however, such a change or deterioration of the efficiency is avoided by the repeated search routines.

Figure 9:
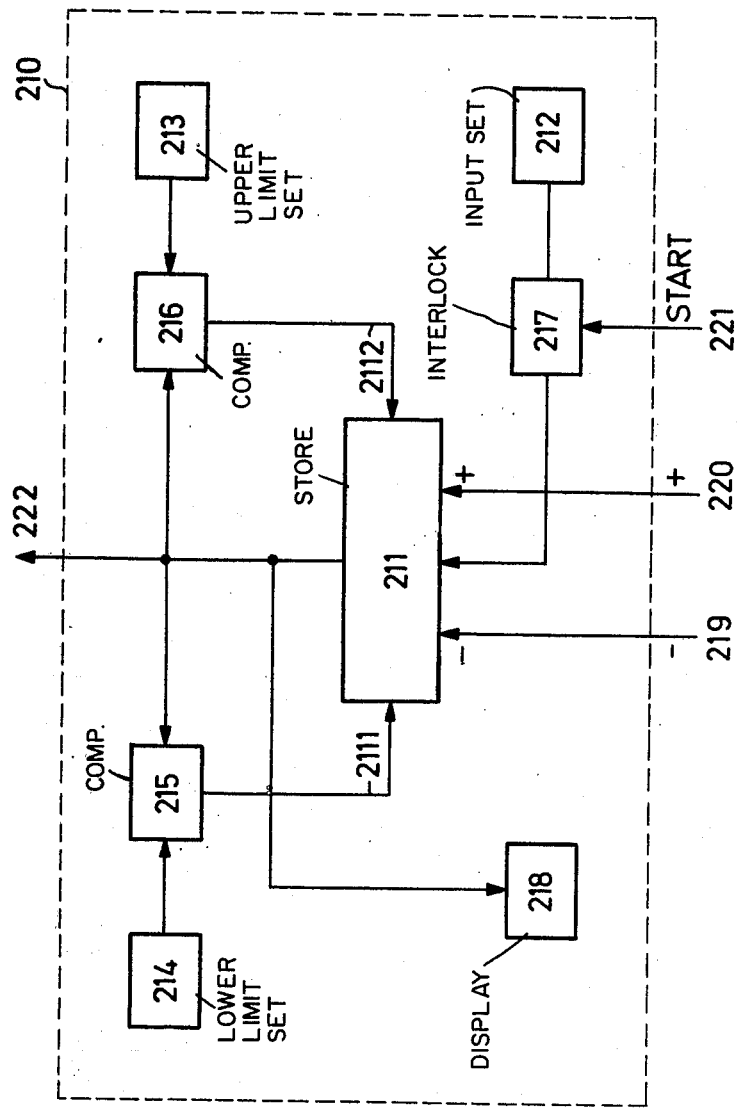
FIG. 9 is a circuit diagram of a control module of the control stage 200 that forms part of the apparatus shown in FIG. 2.

In FIG. 9 a module 210 is shown in more detail. The control stage 200, which is arranged to respond to the operation of the decision stage 400, is composed of a number of these modules. In FIG. 10 these modules 210a, 210b, 210c and 210d are drawn. Each control module has a particular task. The control module 210a in response to signals provided from the circuit 370 of the decision stage 400 over the connections 385 and 386 controls the electroerosion apparatus 100 shown in FIG. 10 in such a way that over the connection 222a the optimum flow rate $q_{opt}$ of the dielectric medium in the operating gap 3 (FIG. 2) is established. This operation was described in detail in connection with FIG. 3a. The dielectric flushing equipment, which is used in this case, is designated with the reference numeral 4 in FIG. 2. The control module 210b of FIG. 10, in response to signals of the connections 385 and 386 of the circuit 370 of the decision stage 400 controls the erosion equipment 100 over the connection 222b in such a way that the periodically recurring back-off of one of the electrodes with respect to the other electrode produces an optimum flow rate of dielectric medium in the operating gap 3. This has been described in detail in connection with FIG. 3b. In FIG. 2 the back-off control 12 is shown in combination with the drive 11.

The control module 210c, in response to signals from the circuit 410 of the decision stage 400 controls the amplitude of the operating pulses which discharge through the operating gap 3 of FIG. 2. during the erosion operation. The corresponding control signals proceed over the connection 222c to the pulse generator 5 for the erosion equipment 100, which is shown in FIGS.

2 and 10 in block designation. This control module 210c is described further below in connection with FIG. 10.

The control module 210d, in response to signals present on the connections 339 and 343 of the circuit 330 of the decision stage 400 controls the interval between the individual operating pulses in the gap 3. The corresponding control signals proceed over the connection 222d to the pulse generator 5 of the erosion equipment 100 shown in FIGS. 2 and 10. The control of the optimum interpulse interval, which is accomplished with this control module 210d, has been described in detail in connection with FIG. 4.

Since the control modules 210a, 210b, 210c and 210d just mentioned have substantially the same circuit construction, their manner of operation will be described with reference to the control module 210 of FIG. 9. It may be assumed that the operator or a programmed numerical control has provided the settings in the input register 212. According to the application to be served by the control module 210, the setting in question can be the rate of flow, the back-off displacement, the interpulse interval, the amplitude of the operating pulse or the like. In the introduction to the description, the operational settings are enumerated as fixed. It should further be assumed that this should be the case before the beginning of the actual erosion process. At this moment the input connection 221 is in the condition 0. The register 212 setting value proceeds over the interlock circuit 217, which is opened by the condition 0 of the connection 221, to the storage device 211. A signal at its output connection 222 corresponds to the content of the storage device 211. An indicator device 218 is provided in parallel hereto in order to make the signal optically visible. The indicator device 218 can be either a digital or an analog display or a printer. The signal, which corresponds to the curve 201 of FIG. 3a or to the curve 121 of FIG. 3b or to the curve of the interpulse interval in FIG. 4, proceeds over the connection 222 to the erosion equipment 100. If now in accordance with FIG. 10 the switch 750 for beginning the automatic regulation is depressed, the connection 221 of FIGS. 9 and 10 assumes the condition 1. The interlock circuit 217 of FIG. 9 is then blocked. The content of the storage device 211 obtained from the input register 212 is retained. Now only the connections 219 and 220 can change the content of the storage device 211. These two connections are fed by the circuit assembly 370 of the decision stage 400 now connected in circuit. If now, as in connection with FIG. 6, signals are provided at the output connection 365 of the circuit 370 of the decision stage 400 for increasing the operation settings, then according to FIG. 9 the content of the storage device 211 will be increased corresponding to the signal over the conductor 220 which is connected with the output conductor 385. The output connection 222 provides the new control signal further to the corresponding components of the erosion equipment 100. If now at the output connection 386 of the circuit 370 of the decision stage 400 a signal appears for reducing the operation setting, the content of the storage device 211 is reduced in correspondence to the incoming signal on the connection 219. The new control signal with the information of the reduced operation setting proceeds over the connection 222 to the corresponding components of the erosion equipment 100.

In the module 210 of FIG. 9 the two input registers 213 and 214 are also provided. In The input register 213 the upper limit value is set in, which must not be exceeded by the operation setting. In the register 214 is set the lower limit value below which the operation setting may not sink. For example a lower limit value $q_n$ or $T_n$ or an upper limit value $q_\sigma$ or $T_\sigma$ of the flow rate $q$ or of the interpulse interval T respectively is indicated in FIGS. 1a,1b,3a,3b and 4. These limit values are set in the two input registers 213 and 214 of the control module 210.

With reference to FIG. 10 the manner of operation of the entire regulation system will now be discussed. Before the beginning of an erosion operation, the electrodes 1 and 2 (FIG. 2) are set in the proper machining position with respect to each other. Besides, if necessary, the so-called deep end dimension (penetration) is set. If for example the tool electrode may penetrate only a certain distance down into the workpiece electrode, a mechanical or electrical device is provided either in the tool apparatus or in the holder of the electrode 1 in which a displacement length can be fixed beyond which the electrode 1 may not erode further into the electrode 2, in connection with which setting the width of the operating gap 3 must also be taken into account. The setting of the so-called deep end length is of course not strictly necessary if the tool electrode 1 is to erode completely through the electrode 2.

The primary operating parameters are now set in the corresponding adjustments of the erosion apparatus 100. As already mentioned in the introduction, the operating parameters are such influential magnitudes as should be kept constant during the actual erosion process or which should be varied during the erosion process according to a particular program. Such a program may, for example, be provided by a numerical control system. In the example of FIG. 10, the operating parameters may be the duration of the operating pulses which is provided in the input register 13 (FIG. 2) and the reference or control value of the gap width, which reference value is set into the register 8 (FIG. 2).

If the erosion operation is to be performed manually, that is if an operator can continuously adjust the individual operation parameters during operation, then the hand switch 650 of FIG. 10 is operated. In this case the switch 399 of the circuit assembly 370 (FIG. 6) and the switch 345 of the circuit 330 (FIG. 8) are operated. These switches put the two previously mentioned circuit assemblies 330 and 370 of the decision stage 400 out of action. The various outputs of the decision stage 400 hold the condition 0. It will now be assumed that the erosion process is started. The evaluation stage 300 and with it the two circuit means 310 and 350 receive from the unit 7 the continuing signal of the regulation error $e$ and from the displacement indicator 9 the signals concerning the direction and movement of the tool electrode 1. During manual operation the evaluation stage 300 on the basis of this information shows the corresponding changes of the integration of the square of the regulation error in accordance with curve 303 (FIGS. 3a,3b) or the movement of the electrode 1 corresponding to the curve 302 (FIGS. 3b,4). This particular indicating device is not shown in the drawings. What is involved in this case is either a digital or an analog indication in the form of a display or a print out or other recording device. The operator will now operate the control stage 200 in accordance with the information of the evaluation stage 300. The operator sets the values of the operation settings (for example, rate of flow of the dielectric medium, back-off distance of the electrode 1, interval between the individual operating pulses and amplitude of the operating pulses) in the input register 212 of each of the control modules 210. Because as the result of manual operation conditions the condition 0 is present on the connection 221 of the control module 210 of FIGS. 9 and 10, this input proceeds to the storage device 211 and from there further to the corresponding components of the electroerosion equipment 100. It should finally be remarked that the synchronizing stage 500 shown in FIG. 10 is not needed during the manual erosion operation.

The operation of the erosion process in automatic drive will now be discussed. Before the beginning of erosion machining, as already mentioned, the input storage device 212 of the control module 210 shown in FIG. 9 is set at the desired value of the operation setting in question and this is furnished to the storage device 211 over the interlock circuit 217. Thereafter the switch 57 (FIG. 10) is actuated, so that on the connection 221 the condition 1 is present. The interlock circuit 217 is blocked. The storage device 211 of the control module 210 can now be controlled only automatically over the output connections 385 and 386 of the circuit assembly 370 of the decision stage 400 or over the input connections 220 and 219 of the corresponding control modules 210a, and 210b, for the start switch 371 of the circuit assembly 370 of FIG. 6 is also actuated over the multivibrator 801.

As already stated in connection with FIGS. 3a, 3b,4,5,6,7,8 and 9, the search routine for the optimum operating setting is carried out and used in the control modules 210a and 210b of the control stage 200 to regulate the erosion process. As shown in FIG. 10, one can either use the control module 210a for performing the search routine in accordance with FIG. 3a or else use the control module 210b for performing the search routine according to FIG. 3b. Which one of these takes place is determined by which of these control modules is connected over the respective connections 385 and 386 to the circuit assembly 310 of the decision stage 400. This is determined by the switch 600 (FIG. 10). In FIG. 10 the control module 210a is connected with the decision stage 400. When this search routine of the circuit assembly 370 has led to the optimum end result, a signal will be provided over the connection 332 to the circuit assembly 330 of the decision stage 400. The search routine for the optimum, that is the smallest, interval between the individual pulses then follows. The control module 210d of which the inputs 219d and 220d are connected with the output connections 339 and 343 respectively of the circuit assembly 330, controls the interpulse interval at the pulse generator 5 of the erosion equipment 100 in correspondence with the output signals of the circuit assembly 330. If the interpulse interval has reached its optimum value under the prevailing conditions of the erosion process, the circuit assembly 330 produces a signal 344 which indicates the termination of the search routine for the optimum interpulse interval and at the same time the other circuit assembly 370 transmits that now a search routine for the optimum flow rate will again take place. In FIG. 10 a circuit arrangement 410 is shown, which corresponds to the aforesaid signal on the connection 344. This circuit arrangement 410 is connected with a further control module 210c. The switch 700 connects the input conductor 220c with the output of the circuit arrangement 410. The function of this circuit arrangement and of the aforesaid control module is to increase the amplitude of the operating pulse in so far as the regulating error $e$ is not increased by a reduction of the interpulse interval. The latter situation takes effect when in the control module 210d for the control of the interpulse interval the lower limit value, which was set in the input register 214, is undercut, so that the condition 1 is produced in the connection 2111d of the control module 210d and a further reduction of the content of the storage device 211 (that is of the interpulse interval) is no longer permitted. In this case, upon arrival of the signal on the connection 344 the AND-gate 802 is opened, so that a pulse is given to the counter 803. The other AND-gate 806, which has an inverting input, is blocked. If now the next adjustment cycle to find the optimum flow rate or the optimum interpulse interval has been completed, the counter 803 will count the next pulse. After a particular number of adjustment cycles the content of the counter 803 becomes full, whereupon it produces an output signal over the multivibrator 804. The signal produced by the monostable multivibrator 804 proceeds over the output circuit 805 of the circuit arrangement 410 to the pulse generator 5 of the electroerosion equipment 100, by way of the control module 210c.

The circuit arrangement 410 operates in the manner just described only when the lower limit $T_n$ of the interpulse interval of FIG. 1b lies above the limit curve G. The circuit arrangement 410 therefore assures that also in this case an optimum of the operating settings is obtained for the erosion process. If the lower limit of the interpulse interval $T_n$ is determined in accordance with FIG. 1b, then the circuit arrangement 410 does not operate. In this case the lower limit is hardly ever reached in the storage device 211d of the control module 210d, so that on the connection 2111d the condition 1 hardly ever occurs. The condition 0 normally holds on this connection, so that the AND-gate 802 of the circuit arrangement 410 is blocked and the other AND-gate 806 is opened. This other AND-gate 806 continually sets back the counter 803 by one pulse. In this case the counter 803 can provide practically no output signals to the monostable multivibrator 804, so that the control module 210c does not need to go into operation for increasing the amplitude of the individual operating pulses.

Up to now the method and the illustrative embodiments of the invention were explained with reference to the manner of operations in which signals of the first condition index variable are generated by the integral of the square of the regulating error signal which is provided over the connection 301 to the first circuit means 350 of the evaluation stage 300 and, further, that signals of the second condition index variable are produced in the form of a breakdown potential value from data furnished over the connections 301 and 302 to the second circuit means 310 of the evaluation stage 300. The breakdown potential or dielectric strength is defined by the relation of the regulating error to the electrode spacing. In FIG. 10 the aforesaid connections 301 for the first condition index variable and 301,3021 and 3022 for the second condition index variable are shown with continuous lines. It will readily be seen that signals for the first condition index variable may be produced from the integral of the square of the acceleration of the movable electrode 1 and those for the second condition index variable may be produced from the breakdown potential. Because the first condition index variable is processed in the first circuit 350 and the second condition index variable in the second circuit means 310, the connections in FIG. 10 are as follows the circuit means 350 receives the signals over the connections 3021 and 3022 shown in dashed lines. The connection 301 to the first circuit means 350 is disconnected. The second circuit means 310 receives the signals from the connections 301,3021 and 3022 which are shown in continuous lines. In such a case the entire system operates in the same way as described.

There is also the possibility that the first condition index variable can be formed from the integral of the quotient of the square of the regulation error $e$ divided by the square of the operating current. This is indicated in FIGS. 2 and 10 by the dashed connection 305. The first circuit means 350 of FIG. 10 is connected only over the connections 301 and 305 with the erosion equipment 100. In this case the second condition index variable is formed from the breakdown potential. The second circuit means 310 of FIG. 10 is therefore connected over the connections 301, 3021 and 3022 with the erosion equipment 100.

Three different possibilities have been described which show that the two condition index variables can be formed out of various magnitudes. For this purpose only the inputs for the connection conductors 301, 3021, 3022 and 305 need be correspondingly changed. The inputs for the second circuit means 310 remain in each case unchanged. Of the three aforesaid cases, only the first case is indicated in FIG. 5, which shows the first circuit means 350. In case two, where the first condition index variable is formed from the integral of the square of the acceleration of the movable electrode 1, the two dashed connections 3021 and 3022 are connected to the squaring device 351 and ultimately to the integrator 352 of FIG. 5. The connecting conductor 301 is interrupted. In case three, where the first condition index variable is formed from the quotient of the square of the regulating error $e$ divided by the square of the operating current, the connection 301, as already shown in FIG. 5, is connected with the squaring device 351. In addition, the dashed line connection 305 is connected further with a squaring device 351' now shown in the drawing. The output of this further squaring device 351' proceeds to a further integrator 352' the control inputs of which are connected to the synchronization stage 500 in the same way as in the case of the other integrator 352. The outputs of the additional integrator 352' are connected in parallel with the following storage device 355 in accordance with FIG. 5.

It should finally be noted that the various magnitudes from which the two condition index variables are formed can represent so-called extremal functions. These extremal functions can be either minimum functions or maximum functions. In the illustrative embodiments described, minimum functions were involved, which have a minimum value, as for example the function Z of FIG. 1a. The invention also operates without difficulty in accordance with maximum functions which have a maximum value. Since the first condition index signal can be said, in a general way, to represent the instability of the process, if the signal is such as to decrease with increasing stability, as in the case of the function Z, the desired extreme value, corresponding to a maximizing of stability, will be a minimum value of the function, whereas if a signal is chosen that increases with increasing stability of the process, as for example a function of the reciprocal of the regulating error, the operation should seek a maximizing of such a signal. It will be understood that maximizing a reciprocal function of the regulating error is the same thing as minimizing the corresponding direct function of the regulating error.

The pulse amplitude applied to the electrode gap is a matter of the amount of power applied in a working pulse and hence the term "pulse amplitude" is here used in a general way to refer to pulse voltage, pulse current and combinations of pulse voltage and current (i.e. pulse power) and variation of the pulse amplitude accordingly means variation of the pulse power by varying the pulse voltage, the pulse current, or both.

It has already been mentioned that instead of varying the interpulse interval, the duty factor (keying ratio) may be varied, or the pulse frequency. When the pulse duration is kept constant, a change of the pulse frequency will, of course, vary the duty factor. To change the duty factor without changing the pulse frequency, the pulse duration must, of course, be changed, so that if the duty factor is to be used as a secondary parameter independently or without reference to the pulse frequency, the pulse duration is no longer fixed as a primary operating parameter, which is to say that it is not desirable in all forms of operation and apparatus in accordance with the invention for the pulse duration to be predetermined or preprogrammed primary operating parameter.

The word "sense" is used in the claims to refer to direction, and more precisely to the choice between two opposed directions, and is not used as an equivalent of "meaning".

Although the invention has been described with respect to specific embodiments, it will be understood that modifications and variations may be made within the inventive concept without departing from the spirit of the invention.

We claim:
1. A method of optimizing conditions of operation, during operation, of an electroerosion machining apparatus having tool and workpiece electrodes, means for setting primary operating parameters including a desired electrode gap spacing and means for adjustment during operation of at least two of the following secondary operating parameters: (a) the rate of flow of a flushing medium in the electrode gap, (b) the interval between successive electric discharge pulses and (c) a combination of electric discharge pulse amplitude and a second characteristic of the sequence of electric discharge pulses which affects the electric power dissipation in the electrode gap, said method comprising the steps of:

generating a first gap condition index signal representative of erosion process stability and a second gap condition index signal representative of potential necessary for gap breakdown, both in response to a change in a first one of said secondary operating parameters;

producing additional changes of said first secondary operating parameter in response to resulting values of said condition index signals in the sense observed to be appropriate to maximize process stability by bringing said first condition index signal to an extreme value while maintaining second condition index variable between predetermined limit values;

repeating the previous two steps with changes of a second one of said secondary operating parameter instead of changes of said first secondary operating parameter, and repeating the complete sequence of the foregoing steps from time to time during operation of said apparatus.

2. A method as defined in claim 1 in which said first secondary operating parameter is the rate of flow of said flushing medium and the second is the interval between successive electric discharge pulses, in which, further, whenever said additional changes of the interval between successive pulses reduces said interval to less than a predetermined limiting value, the pulse amplitude is increased by a predetermined amount and a repetition of the complete sequence of steps of the method is then immediately initiated.

3. A method of automatically optimizing conditions of operation, during operation, of an electroerosion machining apparatus having tool and workpiece electrodes, means for setting primary operating parameters for said operation including a desired electrode gap spacing and means for controlling relative electrode position, including an electrode drive and regulation means therefor from which is obtainable an error signal derived from comparison of electrical measurements of electric discharge conditions in the gap with a reference signal representative of said desired gap spacing, hereinafter referred to as the regulating error signal, said apparatus having also means for initially setting and thereafter maintaining and varying at least under automatic control at least one of the following secondary operating parameters: (a) the rate of flow of a flushing medium in the electrode gap, (b) the interval between successive discharge pulse amplitude and a second characteristic of the sequence of electric discharge pulses which affects the electric power dissipation in the electrode gap; said method comprising the steps of:

subjecting said regulating error signal to a squaring operation and thereby generating a second signal representative of the square of the gap spacing error;

producing, in response to variation in a secondary operating parameter which said apparatus is equipped to vary, a sequence of values of a time integral of said second signal to provide thereby a first condition index signal;

subjecting said regulating error signal to sampling and comparison of successive samples to produce a third signal representative of the time variation of the gap spacing error, said sampling and comparison being performed repetitively in correlation with variations of a secondary operating parameter which said apparatus is equipped to vary;

generating a fourth signal representative of the time variation of the relative electrode position substantially concurrent with said sampling and comparison step;

forming, by interaction of said third and fourth signals, a second condition index signal at least roughly representative of the ratio of said third to said fourth signals, and producing further successive variations of at least one secondary operating parameter of said apparatus, one such parameter at a time, in correlation to successive resulting values of said condition index signals, said variations being made in the direction of variation thereby observed to minimize said first condition index signal while keeping said second condition index signal within predetermined limit values.

4. A method as defined in claim 3 in which two of said secondary parameters, both of which said apparatus is equipped to vary, are automatically varied in alteration with each other in quickly succeeding pairs of alternate variation cycles from time to time during operation of said apparatus, each variation cycle comprising initial variation followed by further variation in correlation with said condition index signals as aforesaid.

5. A method as defined in claim 4 in which said two secondary parameters are the flow rate of said flushing medium and the interval between successive electric discharge pulses.

6. A method as defined in claim 5 in which variation of the flow rate of said flushing medium is accomplished by means directly controlling said flow rate.

7. A method as defined in claim 5 in which variation of the flow rate of said flushing medium is accomplished indirectly by controlling the magnitude of back-off pulses applied to means for producing recurrent back-off movement of at least one electrode of said apparatus.

8. A method as defined in claim 5 in which whenever the interval between successive pulses is reduced to less than a predetermined limiting value at the end of an adjustment cycle, the pulse amplitude is increased by a predetermined amount and thereafter a new pair of adjustment cycles respectively of said rate of flow and of said interval between successive pulses is carried out.

9. A method as defined in claim 5 in which said further adjustment step includes substeps:

evaluating said time integral and storing the result and changing the rate of flow of said flushing medium by a predetermined amount after evaluation of said integral followed by again evaluating said integral and comparing the result with the previous value stored before the change of said rate of flow, and then utilizing the result of this comparison in the event of detection of a substantial difference in said successive evaluations, for further modification of said rate of flow in the direction indicated for reducing the value of said integral.

10. A method as defined in claim 3 in which the said second characteristic of the sequence of electric discharge pulses is the pulse duty cycle.

11. A method as defined in claim 3 in which the said second characteristic of the sequence of electric discharge pulses is the pulse frequency.

12. A method as defined in claim 3 in which said second signal is divided by a signal representative of the square of the electrode gap current to form a quotient signal and in which said quotient rather than said second signal is for producing said sequence of values of a time to provide said first condition index signal, and in which further, the said further successive variations of at least one operating parameter of said apparatus are produced in a manner to minimize said first condition index signal formed by time integration of said quotient signal while keeping said second condition index signal within predetermined limits.

13. A method of automatically optimizing conditions of operation, during such operation, of an electroerosion machining apparatus having tool and workpiece electrodes, means for setting primary operating parameters for said operation including a desired electrode gap spacing, and means for controlling relative electrode position including an electrode drive and regulation means therefor from which are obtainable an error signal derived from measurement of electric discharge conditions in the gap with a reference signal representative of said desired gap spacing, hereinafter referred to as the regulating error signal, and also a second signal, representative of the acceleration of the electrodes of said gap relative to each other resulting from operating of said drive, said apparatus having also means for initially setting and thereafter maintaining and at least varying under automatic control at least one of the following secondary operating parameters: (a) the rate of flow of a flushing medium in the electrode gap, (b) the interval between successive electric discharge pulses, (c) a combination of electric discharge pulse amplitude and another characteristic of the sequence of electric discharge pulses which affects the electric power dissipation in the electrode gap; said method comprising the steps of:

subjecting said regulating error signal to a squaring operation and thereby generating a second signal representative of the square of the gap spacing error;

producing, in response to variation in a secondary operating parameter which said apparatus is equipped to vary, a sequence of values of a time integral of said second signal to provide thereby a first condition index signal;

subjecting said regulating error signal to sampling and comparison of successive samples to produce a fourth signal representative of the time variation of the gap spacing error, said sampling and comparison being performed repetitively in correlation with variations of a secondary operating parameter which said apparatus is equipped to vary;

generating a fifth signal representative of the time variation of the relative electrode position substantially concurrent with said sampling and comparison step;

forming, by interaction of said fourth and fifth signals, a second condition index signal at least roughly representative of the ratio of said fourth to said fifth signals, and producing successive variations of at least one secondary operating parameter of said apparatus in correlation to successive resulting values of said condition index signals, said variations being made in the direction of variation thereby observed to minimize said first condition index signal while keeping said second condition inex signal within predetermined limit values.

14. Apparatus for optimizing conditions of operation, during operation, of an electroerosion machine having tool and workpiece electrodes, means for setting primary operating parameters including a desired electrode gap spacing and means for adjustment during operation of at least two of the following secondary operating parameters: (a) rate of flow of a flushing medium in the electrode gap, (b) the interval between successive electric discharge pulses and (c) a combination of electric discharge pulse amplitude and a second characteristic of the sequence of electric discharge pulses, which affects the electric power dissipation in the electrode gap, said optimizing apparatus comprising:

means for generating a first gap condition index signal representative of erosion process stability and a second gap condition index signal representative of potential necessary for gap breakdown, both in response to a change in one of said secondary operation parameters;

means for producing from time to time an initial change in a first one of said secondary operating parameters and thereby causing said condition index signals to be generated;

means responsive to said condition index signals for automatically producing additional changes of said first secondary operating parameter following an initial change thereof, and for producing said additional changes in a manner such as to maximize process stability by causing said first condition index signal to go to an extreme value while maintaining said second condition index signal between predetermined limits;

means for producing, between successive changes of said first secondary operating parameter produced by said previously mentioned initial change means, an initial change of a second secondary operating parameter and thereby causing said condition index signals to be generated, and means responsive to said condition index signals for automatically producing additional changes of said second secondary operating parameter following an initial change thereof, and for producing said additional changes in a manner such as to maximize process stability by causing said first condition index signal to go to an extreme value while maintaining said second condition index signal between predetermined limits.

15. Optimizing apparatus as defined in claim 14 in which said first secondary operating parameter is the rate of flow of the flushing medium and said second operating parameter is the interval between successive electric discharge pulses and in which, further, means are provided for increasing the pulse amplitude by a predetermined increment, and then initiating a new complete sequence of parameter changes by said initial change means and said additional change means, the pulse amplitude being thus changed in response to the shortening of the said interpulse interval below a predetermined interval magnitude.

16. Apparatus for optimizing conditions of operation, during operation, of an electroerosion machine having tool and workpiece electrodes, means for setting, for said operation, primary operating parameters including a desired electrode gap spacing and means for controlling relative electrode position, including an electrode drive and regulation means therefor from which is obtainable an error signal derived from comparison of electrical measurement of electric discharge conditions in the gap with a reference signal representative of said desired gap spacing, hereinafter referred to as the regulating error signal, said apparatus having also means for initially setting and thereafter maintaining and varying at least under automatic control at least one of the following secondary operating parameters: (a) the rate of flow of a flushing medium in the electrode gap, (b) the interval between successive electric discharge pulses, (c) a combination of electric discharge pulse amplitude and a second characteristic of the sequence of electric discharge pulses which affects the electric power dissipation in the electrode gap; said optimizing apparatus comprising, in combination:

means for squaring said regulating error signal to produce a second signal representative of the square of the gap spacing error;

first circuit means operated in response to variation of a secondary operating parameter which said machine is equipped to vary for producing a sequence of values of a time integral of said second signal and providing thereby a first condition index signal;

second circuit means operated in response to variation of a secondary operating parameter which said machine is equipped to vary for producing a sequence of samples of said regulating error signal and obtaining therefrom a third signal representative of the difference between successive samples of said regulating error signal;

means for generating a fourth signal representative of the time variation of the relative electrode position substantially concurrent with the said sequence of samples of said regulating error signal;

means for forming, by interaction of said third and fourth signals, a second condition index signal at least roughly representative of the ratio of said third to said fourth signal, and means for producing further successive variations of at least one secondary operating parameter of said machine, one such parameter at a time, in correlation to successive resulting values of said condition index signals in the sense determined by said further adjustment producing means to minimize said first condition index signal while keeping said second index signal within predetermined limit values.

17. Operating condition optimizing apparatus as defined in claim 16 in which said machine includes means for varying at least two of said secondary operating parameters and in which means are provided for causing variations of said two secondary operating parameters one after the other in a successive pair of cycles to be automatically produced, each such variation cycle beginning with an imposed variation by said variation causing means, followed by subsequent variation produced by said means for producing further variation in correlation with said condition index variables and terminating when the latter means has determined that said first condition index signal is substantially minimized while said second condition index signal is at a value between said predetermined limits.

18. Operating condition optimizing apparatus as defined in claim 17 in which said two secondary operating parameters are the rate of flow of said flushing medium and the interval between successive electric discharge pulses.

19. Operating condition optimizing apparatus as defined in claim 18 in which said means for varying the rate of flow of said flushing medium embodies means for directly varying said rate of flow.

20. Operating condition optimizing apparatus as defined in claim 18 in which said means for varying the rate of flow of said flushing medium are provided in the form of means for indirectly varying said rate of flow by varying the magnitude of periodic back-off pulses applied to at least one electrode of said gap by the electrode drive of said machine.

21. Operating condition optimizing apparatus as defined in claim 18 in which means are provided for producing an increase in the electric discharge pulse amplitude whenever at the end of a secondary parameter variation cycle pair initiated by said variation causing means the interval between successive electric discharge pulses is less than a predetermined value, and for thereafter causing another pair of secondary parameter variation cycles to be carried out.

22. Operating condition optimizing apparatus as defined in claim 18 in which synchronizing pulse generating means are provided; and in which said first circuit means comprises:

an integrator for repetitive integration of the square of said regulation error signal in each case timed by two pulses of said synchronizing pulse generator;

a comparator means for forming a signal representing the difference between the output signal of said integrator at the end of one time period and the corresponding signal at the end of the immediately preceding time period as stored in a storing means;

means for ascertaining the value of the said difference signal and means for ascertaining the sign of said difference signal and storage means connected to said ascertaining means, connected to supply outputs indicative of their contents to said means for producing further secondary parameters adjustment.

23. Operating condition optimizing apparatus as defined in claim 18 in which said electroerosion machine is provided with a displacement indicator means for indicating, by producing electrical pulses, increments of relative displacement of said electrodes in which said second circuit means comprises:

toggle circuit means with adjustable hysteresis, arranged to open the input of an integrator over a gate circuit whenever said regulation error signal exceeds the hysteresis value, for causing said electrodes to move apart, and also arranged to close the input of said integrator when said regulation error signal is less than said hysteresis value;

and in which said means for generating said second condition index signal together comprises:

said integrator the input of which is controlled as aforesaid, connected over a gate circuit to said displacement indicator means so as to provide, after a predetermined movement length is exceeded, pulses, corresponding to said pulses produced by said displacement indicator means, over a further gate circuit to said further secondary parameter adjustment means.

24. Operating condition optimizing apparatus as defined in claim 18 in which evaluating means are provided in said further secondary parameter adjustment means for each of the two secondary parameters adjustable thereby which evaluating means are connected over conductors, with the inputs, of control means for respectively adjusting the content of storage devices, in dependence on the condition of output conductors of said first and second circuit means and said means for generating said second condition index signal (350, 310).

25. Operating condition optimizing apparatus as defined in claim 24 in which one of said evaluating means (410) includes a counting means for changes of a secondary parameter affecting discharge pulse amplitude, which counting means in response to a second condition of a flipflop of another of said evaluating means, increases its content to provide thereby a modification of the discharge interval, when the discharge interval goes below a lower predetermined limiting value in response to a previous adjustment cycle which counting means also increases the content of a storage device of a control means for modification of the adjustment of said secondary parameter affecting discharge pulse amplitude when the content of said counting means overflows.

26. Operating condition optimizing apparatus as defined in claim 18 in which said means for causing secondary parameter variation is arranged periodically to initiate, by providing a start pulse, a reduction by a predetermined increment of the interval between successive discharge pulses when said regulation error signal does not exceed a predetermined limit value thereof, until a predetermined number of said reductions have been produced subsequent to provision of a start pulse by said means for causing secondary parameter variation.

27. Operating condition optimizing apparatus as defined in claim 26 in which means are provided for manually producing a start pulse having the same effect as the provision of a start pulse by said means for causing secondary parameter variation.

28. Operating condition optimizing apparatus as defined in claim 27 in which means are provided in said electroerosion machine for automatically providing to said means for causing secondary parameter variation, in response to a change of secondary operating parameter of said machine, a start pulse having the same effect as a start pulse initiated as aforesaid by said means for causing secondary parameter variation.

29. Operating condition optimizing apparatus as defined in claim 16 in which said second characteristic of said sequence of pulses is the pulse duty cycle.

30. Operating condition optimizing apparatus as defined in claim 16 in which said second characteristic of said sequence of pulses is the pulse frequency.

31. Operating condition optimizing apparatus as defined in claim 16 in which there is interposed, between the output of said squaring means and said first circuit means, means for producing a quotient signal corresponding to the division of the magnitude of said third signal by the magnitude of the square of the discharge current across the electrode gap, and in which said first circuit produces, as said first condition index signal a sequence of values of a time integral of said quotient signal.

32. Apparatus for optimizing conditions of operation, during operation, of an electroerosion machine having tool and workpiece electrodes, means for setting, for said operation, primary operating parameters including a desired electrode gap spacing and means for controlling relative electrode position including an electrode drive and regulation means therefor from which are obtainable an error signal derived from comparison of electrical measurement of electric discharge conditions in the gap with a reference signal representative of said desired gap spacing, hereinafter referred to as the regulating error signal, and also a second signal representative of the acceleration of the electrodes of said machine relative to each other resulting from operation of said drive, said apparatus having also means for initially setting and thereafter maintaining and varying at least under automatic control at least one of the following secondary operating parameters: (a) the rate of flow of a flushing medium in the electrode gap, (b) the interval between successive electric discharge pulses, (c) a combination of electric discharge pulse amplitude and a second characteristic of the sequence of electric discharge pulses which affects the electric discharge pulses which affects the electric power dissipation in the electrode gap; said optimizing apparatus comprising, in combination:

means for squaring said second signal to produce a third signal representative of the square of the relative electrode acceleration;

first circuit means operated in response to variation of a secondary operating parameter which said machine is equipped to vary for producing a sequence of values of a time integral of said third signal and providing thereby a first condition index signal;

second circuit means operated in response to variation of a secondary operating parameter which said machine is equipped to vary for producing a sequence of samples of said regulating error signal and obtaining therefrom a third signal representative of the difference between successive samples of said regulating error signal;

means for generating a fourth signal representative of the time variation of the relative electrode position substantially concurrent with said sequence of samples of said regulating error signal;

means for forming, by interaction of said third and fourth signals, a second condition index signal at least roughly representative of the ratio of said third to said fourth signal, and means for producing further successive variations of at least one secondary operating parameter of said machine, one such parameter at a time, in correlation to successive resulting values of said condition index signals in the sense determined by said further adjustment producing means to minimize said first condition index signal while keeping said second index signal within predetermined limit values.

* * * * *

UNITED STATES PATENT AND TRADEMARK OFFICE
CERTIFICATE OF CORRECTION

PATENT NO. : 3,975,607
DATED : August 17, 1976
INVENTOR(S) : Werner ULLMANN et al.

It is certified that error appears in the above-identified patent and that said Letters Patent are hereby corrected as shown below:

In Column 39 of the patent, claim 13, line 56, after "condition", correct the spelling of "index".

In Column 42 of the patent, claim 24, line 51, change "18" to -- 17 --.

Signed and Sealed this

Twenty-second Day of February 1977

[SEAL]

Attest:

RUTH C. MASON
Attesting Officer

C. MARSHALL DANN
Commissioner of Patents and Trademarks